US009906432B2

(12) United States Patent
Chokshi et al.

(10) Patent No.: US 9,906,432 B2
(45) Date of Patent: *Feb. 27, 2018

(54) PARTNER DISCOVERY IN CONTROL CLUSTERS USING SHARED VLAN

(71) Applicant: International Business Machines Corporation, Armonk, NY (US)

(72) Inventors: Shaival J. Chokshi, Austin, TX (US); Xiaohan Qin, Austin, TX (US); Patrick T. Vo, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 342 days.

This patent is subject to a terminal disclaimer.

(21) Appl. No.: 14/564,314

(22) Filed: Dec. 9, 2014

(65) Prior Publication Data

US 2016/0164771 A1    Jun. 9, 2016

(51) Int. Cl.
G06F 15/173    (2006.01)
H04L 12/751    (2013.01)
H04L 12/46    (2006.01)
H04L 12/24    (2006.01)

(52) U.S. Cl.
CPC ........ H04L 45/026 (2013.01); H04L 12/4641 (2013.01); *H04L 41/0659* (2013.01)

(58) Field of Classification Search
CPC ................... H04L 45/026; H04L 12/4641
USPC ................................................ 709/224, 223
See application file for complete search history.

(56) References Cited

U.S. PATENT DOCUMENTS

| 2002/0143944 A1* | 10/2002 | Traversat ............ G06F 9/4416 709/225 |
| 2002/0184357 A1 | 12/2002 | Traversat et al. |
| 2003/0041141 A1 | 2/2003 | Abdelaziz et al. |
| 2006/0123204 A1 | 6/2006 | Brown |

(Continued)

FOREIGN PATENT DOCUMENTS

| JP | 02005202968 A | 7/2005 |
| WO | 000186486 A2 | 11/2001 |
| WO | 2011142972 A2 | 11/2011 |

OTHER PUBLICATIONS

Appendix P, Jun. 3, 2015.

(Continued)

*Primary Examiner* — Dustin Nguyen
*Assistant Examiner* — Joel Mesa
(74) *Attorney, Agent, or Firm* — Garg Law Firm, PLLC; Rakesh Garg; Joseph Petrokaitis

(57) ABSTRACT

At a first virtual device executing in a data processing system, a determination is made whether a partner list associated with the first virtual device includes a threshold number of partner virtual devices, the first virtual device participating in the control cluster. A first Live packet is unicast over the VLAN to each partner virtual device identified in the partner list. A unicast of a second Live packet from a second virtual device to the first virtual device is received over the VLAN, the second virtual device being identified in the partner list. A Hello packet is broadcast over the VLAN to cause the Hello packet to reach a third virtual device, wherein the Hello packet is configured to discover a new partner virtual device to add to the partner list, discovering the new partner enlarging the control cluster.

4 Claims, 14 Drawing Sheets

(56) References Cited

U.S. PATENT DOCUMENTS

2012/0198076 A1     8/2012   Kancharla et al.
2013/0117481 A1     5/2013   Allen et al.

OTHER PUBLICATIONS

Appendix P, Mar. 25, 2015.
López Vega, et al; "Discovery and Signaling Enhancements for Data-Centric Publish-Subscribe Environments." (2014).
Yau, Stephen S., et al; "A lightweight middleware protocol for ad hoc distributed object computing in ubiquitous computing environments." InObject-Oriented Real-Time Distributed Computing, 2003. Sixth IEEE International Symposium on, pp. 172-179. IEEE, 2003.

\* cited by examiner

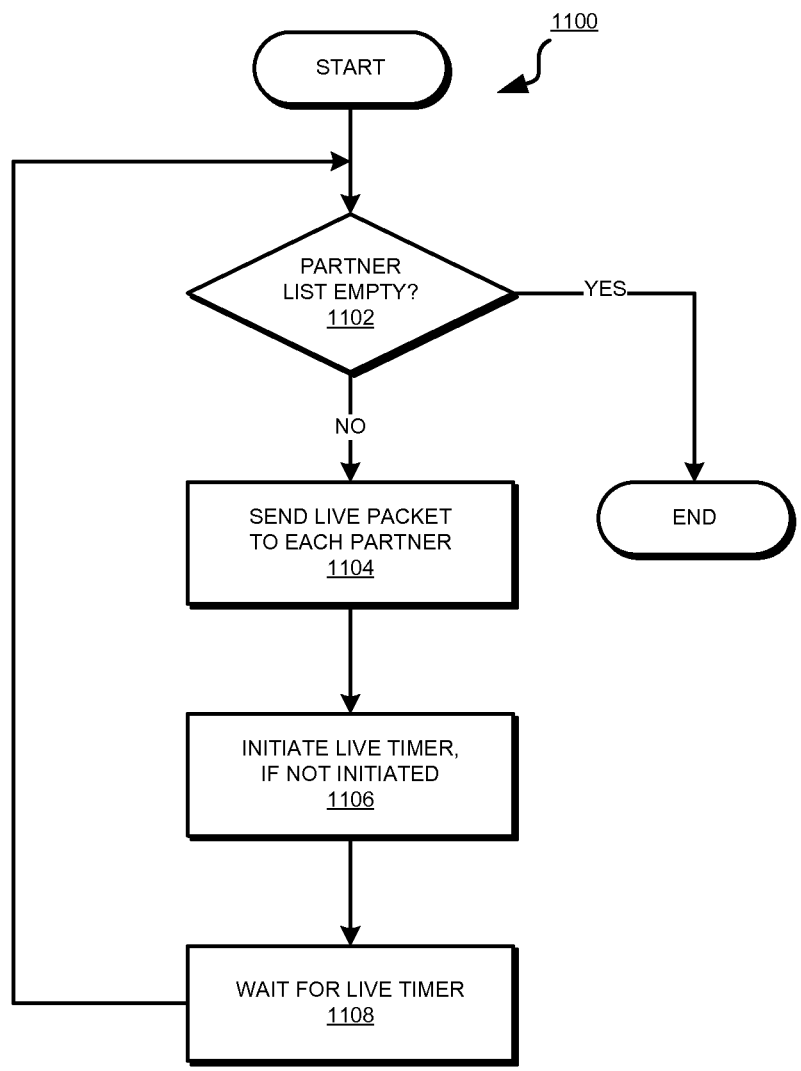

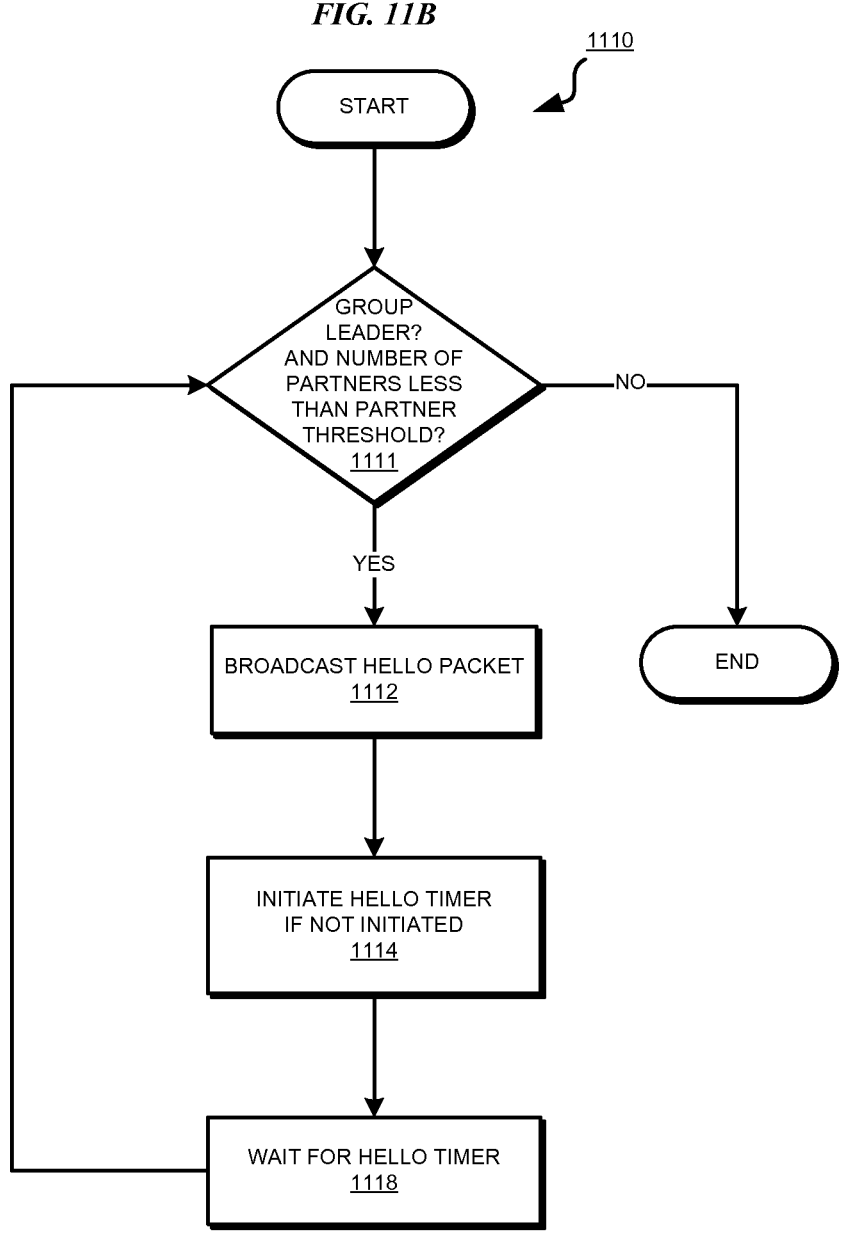

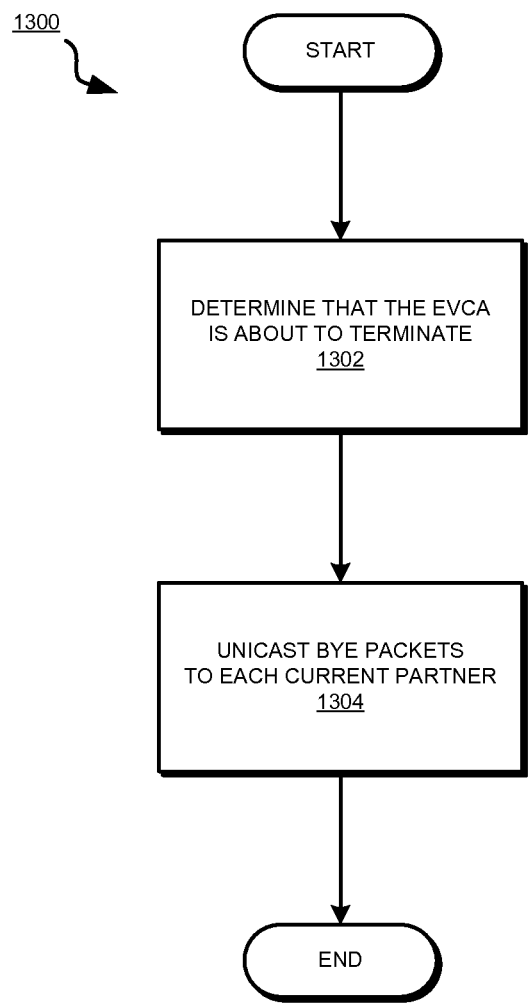

PARTNER DISCOVERY IN CONTROL CLUSTERS USING SHARED VLAN

TECHNICAL FIELD

The present invention relates generally to a system, and computer program product for managing redundant adapters. More particularly, the present invention relates to a system, and computer program product for partner discovery in a control cluster using a shared virtual local area network (VLAN).

BACKGROUND

A data processing system can be configured to operate as more than one data processing system in a variety of ways. For example, a data processing system can be divided into logical partitions (LPARs). Such data processing systems are also known as logically partitioned data processing systems or host systems. A host system operates as a virtualized data processing environment. A logically partition is also known simply as a "partition." Each partition operates as a separate data processing system independent of the other partitions.

Generally, a partition management firmware component connects the various partitions and provides the network connectivity among them. A hypervisor is an example of such partition management firmware. A partition shares all or some of the resources available in the host system on which the partition operates. The shared resources can be hardware, software, or firmware available in the host system. Some examples of host system resources shared by one or more partitions executing on the host system include, but are not limited to, one or more processor, memory, adapters, storage devices, an operating system component, a firmware component, and a bus.

A host system can be configured to operate as multiple data processing systems in ways other than partitions as well. Virtual Input/Output System (VIOS) is another method for operating a host system as multiple data processing systems. Hereinafter, the term "partition" comprises not just logical partitions created by partitioning a host system but also other configurations of multiple data processing systems configured on a host system in other ways.

Regardless of how the multiple data processing systems are configured on a host system, resource sharing is a common aspect of all such configurations. Virtualization is one method by which the partitions share a host system's resources. For example, if the host system includes one physical input/output (I/O) adapter, such as an Ethernet network adapter, that physical network adapter is virtualized so that one or more virtual network adapters refer back to the physical adapter.

For example, one partition may be assigned one of the virtual adapters and another partition may be assigned another one of the virtual adapters. Both partitions use the same physical adapter, using a bridging mechanism.

Multiple physical resources can be virtualized and utilized by partitions in this manner. Multiple copies of a resource can similarly be virtualized and used by the partitions. For example, if a host system supports multiple network adapters for redundancy, each of those multiple adapters can be virtualized, and their corresponding virtual adapters assigned to a partition to provide similar redundancy in the partition.

In one example configuration, multiple virtual adapters corresponding to the same physical adapter couple with each other via a virtual switch in the hypervisor. The virtual switch enables each coupled virtual adapter to communicate with each other and with an external data processing system. For example, the virtual switch sends the packets from a virtual adapter to an external destination, and receives packets from an external source for a virtual adapter, using a virtual trunk adapter. The virtual trunk adapter communicates with a virtual bridge, and the virtual bridge in-turn communicates with the physical adapter to make such data communications possible.

SUMMARY

The illustrative embodiments provide a system, and computer program product for partner discovery in a control cluster using shared VLAN. An embodiment includes a method for partner discovery in a control cluster using a shared virtual local area network (VLAN). The embodiment determines, at a first virtual device executing in a data processing system, whether a partner list associated with the first virtual device includes a threshold number of partner virtual devices, the first virtual device participating in the control cluster. The embodiment unicasts over the VLAN, responsive to the partner list not being empty, to each partner virtual device identified in the partner list, a first Live packet. The embodiment receives over the VLAN, responsive to the partner list not being empty, a unicast of a second Live packet from a second virtual device to the first virtual device, the second virtual device being identified in the partner list. The embodiment broadcasts over the VLAN, a Hello packet, to cause the Hello packet to reach a third virtual device, wherein the Hello packet is configured to discover a new partner virtual device to add to the partner list, discovering the new partner enlarging the control cluster.

Another embodiment includes a computer usable program product comprising a computer readable storage device including computer usable code for partner discovery in a control cluster using a shared virtual local area network (VLAN). The embodiment further includes computer usable code for determining, at a first virtual device executing in a data processing system, whether a partner list associated with the first virtual device includes a threshold number of partner virtual devices, the first virtual device participating in the control cluster. The embodiment further includes computer usable code for unicasting over the VLAN, responsive to the partner list not being empty, to each partner virtual device identified in the partner list, a first Live packet. The embodiment further includes computer usable code for receiving over the VLAN, responsive to the partner list not being empty, a unicast of a second Live packet from a second virtual device to the first virtual device, the second virtual device being identified in the partner list. The embodiment further includes computer usable code for broadcasting over the VLAN, a Hello packet, to cause the Hello packet to reach a third virtual device, wherein the Hello packet is configured to discover a new partner virtual device to add to the partner list, discovering the new partner enlarging the control cluster.

Another embodiment includes a data processing system for partner discovery in a control cluster using a shared virtual local area network (VLAN). The embodiment further includes a storage device, wherein the storage device stores computer usable program code. The embodiment further includes a processor, wherein the processor executes the computer usable program code, and wherein the computer usable program code comprises. The embodiment further includes computer usable code for determining, at a first virtual device executing in a data processing system, whether a partner list associated with the first virtual device includes a threshold number of partner virtual devices, the first virtual device participating in the control cluster. The embodiment further includes computer usable code for unicasting over the VLAN, responsive to the partner list not being empty, to each partner virtual device identified in the partner list, a first Live packet. The embodiment further includes computer usable code for receiving over the VLAN, responsive to the partner list not being empty, a unicast of a second Live packet from a second virtual device to the first virtual device, the second virtual device being identified in the partner list. The embodiment further includes computer usable code for broadcasting over the VLAN, a Hello packet, to cause the Hello packet to reach a third virtual device, wherein the Hello packet is configured to discover a new partner virtual device to add to the partner list, discovering the new partner enlarging the control cluster.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 11A depicts a flowchart of an example process for maintaining partnerships in a control cluster using shared VLAN in accordance with an illustrative embodiment;

FIG. 11B depicts a flowchart of an example process for partner discovery in a control cluster using shared VLAN in accordance with an illustrative embodiment;

FIG. 13 depicts a flowchart of an example process for exiting a control cluster in accordance with an illustrative embodiment.

DETAILED DESCRIPTION

Figure 1:
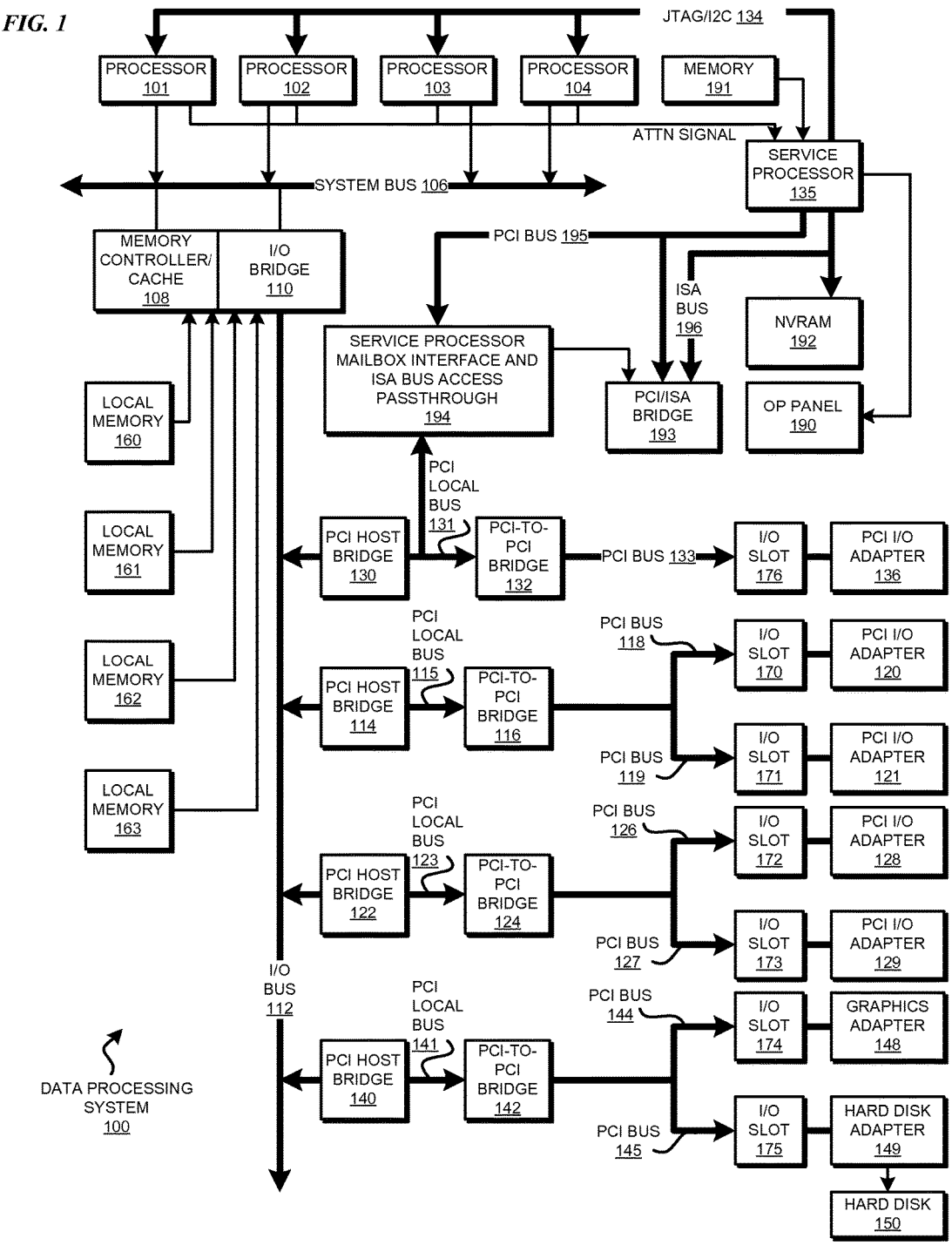
FIG. 1 depicts a block diagram of a network of data processing systems in which illustrative embodiments may be implemented.

When redundant physical adapters are configured as bridging devices, e.g., Shared Ethernet Adapter as in PowerVM architecture to support virtual adapters in a partition, such as in a client partition, generally, one of bridges takes on additional responsibilities. (PowerVM is a trademark of IBM Corporation in the United States and in other countries). For example, each bridge employs a virtual adapter as control adapter to communicate with its peers to determine their respective role.

Hereinafter, only for the clarity of the description and without implying any limitation thereto, the illustrative embodiments are described using a physical Ethernet adapter (PEA), the corresponding virtual Ethernet adapter (VEA), a virtual control adapter (VCA) and a shared Ethernet adapter (SEA). Other adapters, or generally other resources that can be virtualized and used in a host in a similar manner, may also operate in some redundancy configuration as described herein. Accordingly, an embodiment can be adapted for use with such other virtualized resources within the scope of the illustrative embodiments. A generalized form of a virtual resource, including but not limited to VEA and VCA is hereinafter referred to as a virtual adapter (VA).

Consider the example of a pair of SEAs operating in a host. The two SEAs reside in different VIOSs in the host. Each SEA connects/bridges a different PEA available in the host, and uses a VCA to communicate with its peer.

The VIOSs in a host operate as one or more redundant pairs. In other words, a VIOS that operates as a primary VIOS in a host has a partner VIOS which acts as a redundant backup VIOS for the primary VIOS. Accordingly, the pair of VCAs in a redundant pair of VIOS are coupled over a VLAN via a virtual switch. The VCAs negotiate the role of the SEAs in the pair at any given time using a failover protocol, a load sharing protocol, or other suitable mechanism.

A pair of redundant VCAs in a redundant configuration is also called a control channel. The number of VIOS operating in a host may depend on the number of PEAs available in the host and the number of PEAs configured per VIOS in the host. For example, if the host has twenty PEAs, two redundant PEAs for each distinct external network, and one PEA per VIOS, there operate twenty VIOS in that host, in ten redundant pairs. Accordingly, ten redundant pairs of VCAs operate and negotiate their roles in the host. When two PEAs are configured per VIOS, there operate ten VIOS in that host, in five redundant pairs. Still, ten redundant pairs of VCAs operate and negotiate their roles in the host.

The illustrative embodiments recognize that presently, each pair of VCAs in the available redundant VCAs, to with a control channel, has to establish a separate VLAN that is dedicated for exclusive use of that pair of VCAs. Over this VLAN, the VCAs of the control channel broadcast messages to perform the above mentioned negotiations and other management tasks.

The illustrative embodiments further recognize that in order to avoid interference among different control channels on the same virtual switch, each control channel is presently required to select a distinct VLAN. For example, if three pairs of VCAs—namely, VCA1 and VCA2, VCA3 and VCA4, and VCA5 and VCA6—are configured and available in a host, the control channel VCA1-VCA2 has one dedicated VLAN, the control channel VCA3-VCA4 has a second dedicated VLAN, and the control channel VCA5-VCA6 has a third dedicated VLAN.

The illustrative embodiments recognize that the restrictive requirement of dedicated VLANs for each control channel in a virtual switch has several significant drawbacks. For example, the illustrative embodiments recognize that a set of VLANs must be reserved for the control channels, and therefore those VLANs cannot be used for other productive purposes, such as in a customer's data network.

As another example, the illustrative embodiments recognize that the requirement of distinctive VLAN per control channel makes the configuration of the VCAs error prone.

For example, actual implementations based on such prior-art requirements and restrictions have reported a significant number of problems in redundant VCA configuration due to improper selection of a wrong VLAN for one VCA, or both VCAs. For example, a VLAN used by a control channel may be in conflict with other VLANs used by a customer's data network. As another example, a VLAN can easily be misconfigured in a VCA such that the VLAN number or id does not match the number or id configured in the VCA's partner VCA in the control channel.

The illustrative embodiments used to describe the invention generally address and solve the above-described problems and other problems related to managing redundant virtualized resources in a data processing system. The illustrative embodiments provide a system, and computer program product for partner discovery in a control cluster using shared VLAN.

An embodiment can be implemented as an application in software, hardware, or firmware, to enhance the operation of a prior-art VCA (device) in the manner described herein. A VCA enhanced with an embodiment is hereinafter referred to as an enhanced virtual control adapter (EVCA). Other redundant virtualized resources or devices can similarly be enhanced to result in a corresponding enhanced virtual resource within the scope of the illustrative embodiments.

Hereinafter, the operations, procedures, communications, conditions, and data used therein, to perform a function of an embodiment are collectively referred to as a Partner Discovery Protocol (PDP). An operation according to the PDP enables multiple VCAs to share a common VLAN. For example, where a prior-art example described above with three pairs of VCAs uses at least three distinct VLANs, an embodiment can operate the three pairs of VCAs or any number of redundant VCA pairs on a single dedicated VLAN.

A prior-art control channel is limited to two VCAs operating in partnership. An embodiment using PDP allows any number of VCAs to negotiate the control adapter function using a novel combination of broadcast and unicast messages. Operating according to PDP, an embodiment allows a VCA to have not just one partner VCA but an unrestricted number of partner VCAs, limited only by the number of VCAs configured in a given data processing system.

Furthermore, a control channel according to an embodiment using PDP comprises any number of VCAs, all communicating, negotiating, and managing their functions over a single VLAN. Such a group of VCAs is also referred to as a control cluster (cluster) in this disclosure.

Furthermore, an embodiment allows any VCA in a control cluster to take on the control adapter role, i.e., become the leader device, if the VCA satisfies certain conditions described elsewhere in this disclosure. The embodiment allows the control adapter role to be transferred to another VCA remaining in the control cluster if a VCA that is operating as the control adapter becomes inactive, leaves the cluster, or otherwise becomes unable to perform in the control adapter role.

Certain operations, procedures, communications, conditions, and data used therein, according to PDP are now described by way of an example implementation. One or more of the operations, procedures, communications, conditions, and data used therein, can be implemented in an embodiment, and the described implementation is not intended to be limiting on the illustrative embodiments. From this disclosure, those of ordinary skill in the art will be able to conceive other ways of configuring the operations, procedures, communications, conditions, and data used therein, of the described PDP for a similar purpose, and the same are contemplated within the scope of the illustrative embodiments.

In an example implementation, the Partner Discovery Protocol uses three type of packets:

PDP_PKT_Hello (Hello, Hello packet or Hello message)—This type of packet is broadcasted to all devices that are listening in a cluster. This packet is designed for each device to find its partner. The packet is sent at fixed interval until a desired number of partners are found.

PDP_PKT_Live (Live, Live packet or Live message)—This type of packet is unicasted from a specific sender device to a specific partner device with which the sender device has established a partnership, or with which the sender device wishes to establish a partnership in response to a Hello message from such device. This type of packet also informs a partner device that the sender device of a packet of this type is operational or alive. This type of packet is sent at a fixed interval as long as the sender device has at least one partner, i.e., the sender device's partner list is not empty.

PDP_PKT_Bye (Bye, Bye packet or Bye message)—This type of packet is unicasted from a specific sender device to a specific partner device. A packet of this type informs the receiving device that the sending device is about to become inoperational, inactive, or non-participant in the cluster.

Each of the three types of packets includes the following information:

Identification—this can be any type of identifier, including but not limited to a Media Access Control (MAC) address of the device that is sending the packet.

A priority or ranking information—this can be any information suitable for identifying a relative rank of a device in a group of devices. This information is usable to determine a leader device in a given cluster.

Criterion—this is used to identify a partner device. Any type and/or number of conditions can be included as the criteria, which a device has to satisfy in order to become a partner of the device that sent the packet where the one or more criteria are included.

Known partners' information—this information identifies each partner device with which the sender of the packet has an already established partnership in the cluster.

PDP also make use of three timers:

PDP_TMR_Hello (Hello timer)—This timer determines whether a sender device can send a Hello packet, and if so, a periodicity of the Hello packet. This timer should be running at a device if the number of partners found by the device is less than the desired number of partners, thereby allowing the device to broadcast a Hello packet.

PDP_TMR_Live (Live timer)—This timer determines a periodicity with which a device unicasts a Live packet to a partner device. This timer should be running at a device unless the device has no partners.

PDP_TMR_LiveTimeout (Live timeout timer, Live T/O timer)—This timer is for a device to check periodically whether a partner of the device has sent a PDP_PKT_Live message within the period set in this timer.

As an optional optimization feature, PDP allows an implementation to define two parameters to minimize the number of broadcast discovery packets (PDP_PKT_Hello)—

Desired number of partners—This parameter is used for stopping sending PDP_PKT_Hello once the desired number of partners has been found. This parameter is also usable to prune the number of inactive partners.

Group leader—This parameter is to identify the leader device. Only the leader device is allowed to send, or is responsible for sending, PDP_PKT_Hello among active partners when the number of active partners is less than the desired number of partners. A device can be designated Group leader based on the device's priority or ranking information described earlier.

In Operating According to PDP—

1. At initialization, a first device broadcasts PDP_PKT_Hello and starts PDP_TMR_Hello.

2. At runtime, 2.a.—A second device receives a PDP_PKT_Hello whose partner criteria the device meets. Assuming that the Hello packet from the first device is such a packet, in response to such a Hello packet, the second device responds with PDP_PKT_Live, which the second device unicasts to the first device. The Live packet from the second device to the first device includes the information of second device, to wit, the identification, priority or ranking information, and known partners' information. The second device adds the first device (the sender of the Hello packet) as a known partner to the second device's partner list, and identifies the first device in the Live packet as a known partner of the second device. The second device starts PDP_TMR_Live if that timer was not previously started. If the second device was also sending Hello packets before receiving the first device's Hello packet, the second device may stop its PDP_TMR_Hello if that timer was running and if rule 2.f. below is satisfied. The second device may also remove an inactive partner device from its partner list to accommodate the first device as a partner, if rule 2.h. below is satisfied.

2.b.—Upon receiving a PDP_PKT_Hello that does not meet the partner criteria, the second device drops the Hello packet. For example, suppose that the second device also received a Hello packet from a third device. The second device evaluates the criteria in the Hello packets from the first device and the third device and finds that the second device satisfies the criteria of the Hello packet from the first device but not the criteria of the Hello packet from the third device. Accordingly, the second device drops the Hello packet from the third device, and responds to the first device with a unicast Live packet.

2.c.—When the first device receives PDP_PKT_Live form the second device, the first device adds the second device to the first device's active partner list. The first device then unicasts a Live packet to each partner on the first device's partner list. The live packet containing the first device's partner list, including the second device, if the second device is not already a known partner of a partner of the first device. The first device starts PDP_TMR_Live if that timer was not previously started. The first device may stop its PDP_TMR_Hello if that timer was running and if rule 2.f. below is satisfied. The first device may also remove an inactive partner device from its partner list to accommodate the second device as a partner, if rule 2.h. below is satisfied.

2.d.—Upon receiving a unicast PDP_PKT_Bye, a device simply remove the sender of the Bye packet from the partner list of the device, if that sender is present in the device's partner list. For example, if the second device sends a Bye packet to the first device, the first device removes the second device from the partner list of the first device, if the second device is present in the first device's partner list. The receiver of the Bye packet may stop PDP_TMR_Live timer if there is no more partners remaining in the receiver device's partner list. The receiver device may start PDP_TMR_Hello, if rule 2.g. is satisfied.

2.e.—At PDP_TMR_LiveTimeout, each device checks whether its partners have sent PDP_PKT_Live messages. In one embodiment, each device in a cluster shares a common Live timeout timer that is common to the cluster, and refers to that common Live timeout timer in 2.e. In another embodiment, each device maintains a separate Live timeout timer, to which it refers in 2.e. In case a device has lost any active partner, i.e., not received a Live packet from that partner, the device may start PDP_TMR_Hello, if rule 2.g., is satisfied.

2.f.—When one (or more) active partner is discovered (cases 2.a and 2.c), each device determines on its own whether it acts as a group leader among the active partners. For example, if the first device and the second device are partners, the first device compares its priority or ranking information with the second device's priority or ranking information, and the second device performs a similar comparison with the first device. Whichever device has the higher priority or ranking information in the comparison assumes the group leader position. Any number of devices can perform a similar comparison to identify the group leader. If a device concludes from the comparison that the device is the group leader, the device checks whether the number of active partners in the device's partner list is less than the desired number of partners. If the number of active partners in the device's partner list is less than the desired number of partners, PDP_TMR_Hello should be running, and the device keeps the Hello timer running. If the number of active partners in the device's partner list is not less than the desired number of partners, the device stops PDP_TMR_Hello timer if Live timer is running. If the device concludes from the comparison that the device is not the group leader, the device stops its PDP_TMR_Hello if the device's Live timer was running, so that the device no longer sends PDP_PKT_Hello.

2.g.—When a device loses one or more active partners, i.e., does not receive Live packets from those one or more partners, e.g., in 2.d. and 2.e., each device determines on its own whether it acts as a group leader among the remaining active partners. If a device concludes from the comparison that the device is the group leader, the device checks whether the number of active partners in the device's partner list is less than the desired number of partners. If the number of active partners in the device's partner list is less than the desired number of partners, the device starts its PDP_TM- R_Hello, if the device's Hello timer is not running already. If the number of active partners in the device's partner list is not less than the desired number of partners, the device's PDP_TMR_Hello should not be running, and the device does not manipulate its PDP_TMR_Hello. If the device is not the group leader, the device's PDP_TMR_Hello should not be running either, and the device does not manipulate its PDP_TMR_Hello.

2.h.—If a device discovers one or more new active partners, e.g., in 2.a. and 2.c., and if the total number of partners in the device's partner list is already larger than, or will become larger than, the number of desired partners from adding the new partners, the device prunes or removes inactive partners from the device's partner list until the total number of remaining partners on the device's partner list equals to the number of desired partners for the device or no more inactive partners remain in the device' partner list to remove.

3. When a device is set for termination, deactivation, or otherwise removal from a cluster, the device unicasts PDP_PKT_Bye to each of the device's partners on the device's partner list.

The description of the example implementation ends here.

A method of an embodiment described herein, when implemented to execute on a device or data processing system, comprises substantial advancement of the functionality of that device or data processing system in managing redundant virtual devices. For example, in order to manage pairs of redundant virtual devices, the prior-art requires the distinct VLANs to be used for each pair. In contrast, an embodiment allows all available virtual devices to collaborate and manage redundancy, failover, or load balancing functions using a single VLAN. Operating in a manner described herein, an embodiment allows clusters of virtual devices for operate over a single VLAN, with capabilities to transfer the leader functions automatically amongst the devices that remain in the cluster. Such manner of virtual device management is unavailable in presently available devices or data processing systems. Thus, a substantial advancement of such devices or data processing systems by executing a method of an embodiment increases the VLAN space availability for more productive use, such as in a customer's network, reduces the chances of error in configuring redundancy, failover, or load balancing amongst multiple comparable virtual resources, by selectively using broadcast and unicast messaging to reduce the congestion and resource usage in the network.

The illustrative embodiments are described with respect to certain physical and virtual devices or resources, packets, parameters, timers, conditions, criteria, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

With reference to FIG. 1, this figure depicts a block diagram of an example data processing system in which the illustrative embodiments may be implemented. Data processing system 100 may be, for example, a symmetric multiprocessor (SMP) system including a plurality of processors 101, 102, 103, and 104, which connect to system bus 106. For example, data processing system 100 may be an IBM Power System® implemented as a server within a network. (IBM and Power Systems are trademarks of International Business Machines Corporation in the United States and other countries). Alternatively, a single processor system may be employed and processors 101, 102, 103, and 104 may be cores in the single processor chip. Alternatively, data processing system 100 may include processors 101, 102, 103, 104 in any combination of processors and cores.

Also connected to system bus 106 is memory controller/cache 108, which provides an interface to a plurality of local memories 160-163. I/O bus bridge 110 connects to system bus 106 and provides an interface to I/O bus 112. Memory controller/cache 108 and I/O bus bridge 110 may be integrated as depicted.

Data processing system 100 is a logically partitioned data processing system. Thus, data processing system 100 may have multiple heterogeneous operating systems (or multiple instances of a single operating system) running simultaneously. Each of these multiple operating systems may have any number of software programs executing within it. Data processing system 100 is logically partitioned such that different PCI I/O adapters 120-121, 128-129, and 136, graphics adapter 148, and hard disk adapter 149 may be assigned to different logical partitions. In this case, graphics adapter 148 connects to a display device (not shown), while hard disk adapter 149 connects to and controls hard disk 150.

Thus, for example, suppose data processing system 100 is divided into three logical partitions, P1, P2, and P3. Each of PCI I/O adapters 120-121, 128-129, 136, graphics adapter 148, hard disk adapter 149, each of host processors 101-104, and memory from local memories 160-163 is assigned to one of the three partitions. In these examples, memories 160-163 may take the form of dual in-line memory modules (DIMMs). DIMMs are not normally assigned on a per DIMM basis to partitions. Instead, a partition will get a portion of the overall memory seen by the platform. For example, processor 101, some portion of memory from local memories 160-163, and I/O adapters 120, 128, and 129 may be assigned to logical partition P1; processors 102-103, some portion of memory from local memories 160-163, and PCI I/O adapters 121 and 136 may be assigned to partition P2; and processor 104, some portion of memory from local memories 160-163, graphics adapter 148 and hard disk adapter 149 may be assigned to logical partition P3.

Each operating system executing within data processing system 100 is assigned to a different logical partition. Thus, each operating system executing within data processing system 100 may access only those I/O units that are within its logical partition. Thus, for example, one instance of the Advanced Interactive Executive (AIM operating system may be executing within partition P1, a second instance (image) of the AIX operating system may be executing within partition P2, and a Linux® or IBM-i® operating system may be operating within logical partition P3. (AIX and IBM-i are trademarks of International business Machines Corporation in the United States and other countries. Linux is a trademark of Linus Torvalds in the United States and other countries).

Peripheral component interconnect (PCI) host bridge 114 connected to I/O bus 112 provides an interface to PCI local bus 115. A number of PCI input/output adapters 120-121 connect to PCI local bus 115 through PCI-to-PCI bridge 116, PCI bus 118, PCI bus 119, I/O slot 170, and I/O slot 171. PCI-to-PCI bridge 116 provides an interface to PCI bus 118 and PCI bus 119. PCI I/O adapters 120 and 121 are placed into I/O slots 170 and 171, respectively. Typical PCI bus implementations support between four and eight I/O adapters (i.e. expansion slots for add-in connectors). Each PCI I/O adapter 120-121 provides an interface between data processing system 100 and input/output devices such as, for example, other network computers, which are clients to data processing system 100.

An additional PCI host bridge 122 provides an interface for an additional PCI local bus 123. PCI local bus 123 connects to a plurality of PCI I/O adapters 128-129. PCI I/O adapters 128-129 connect to PCI local bus 123 through PCI-to-PCI bridge 124, PCI bus 126, PCI bus 127, I/O slot 172, and I/O slot 173. PCI-to-PCI bridge 124 provides an interface to PCI bus 126 and PCI bus 127. PCI I/O adapters 128 and 129 are placed into I/O slots 172 and 173, respectively. In this manner, additional I/O devices, such as, for example, modems or network adapters may be supported through each of PCI I/O adapters 128-129. Consequently, data processing system 100 allows connections to multiple network computers.

Memory mapped graphics adapter 148 is inserted into I/O slot 174 and connects to I/O bus 112 through PCI bus 144, PCI-to-PCI bridge 142, PCI local bus 141, and PCI host bridge 140. Hard disk adapter 149 may be placed into I/O slot 175, which connects to PCI bus 145. In turn, PCI bus 145 connects to PCI-to-PCI bridge 142, which connects to PCI host bridge 140 by PCI local bus 141.

A PCI host bridge 130 provides an interface for a PCI local bus 131 to connect to I/O bus 112. PCI I/O adapter 136 connects to I/O slot 176, which connects to PCI-to-PCI bridge 132 by PCI bus 133. PCI-to-PCI bridge 132 connects to PCI local bus 131. PCI local bus 131 also connects PCI host bridge 130 to service processor mailbox interface and ISA bus access pass-through logic 194 and PCI-to-PCI bridge 132.

Service processor mailbox interface and ISA bus access pass-through logic 194 forwards PCI accesses destined to PCI/ISA bridge 193. NVRAM storage 192 connects to ISA bus 196. Service processor 135 connects to service processor mailbox interface and ISA bus access pass-through logic 194 through its local PCI bus 195. Service processor 135 also connects to processors 101-104 via a plurality of JTAG/I2C busses 134. JTAG/I2C busses 134 are a combination of JTAG/scan busses (see IEEE 1149.1) and Phillips I2C busses.

However, alternatively, JTAG/I2C busses 134 may be replaced by only Phillips I2C busses or only JTAG/scan busses. All SP-ATTN signals of the host processors 101, 102, 103, and 104 connect together to an interrupt input signal of service processor 135. Service processor 135 has its own local memory 191 and has access to hardware OP-panel 190.

When data processing system 100 is initially powered up, service processor 135 uses the JTAG/I2C busses 134 to interrogate the system (host) processors 101-104, memory controller/cache 108, and I/O bridge 110. At the completion of this step, service processor 135 has an inventory and topology understanding of data processing system 100. Service processor 135 also executes Built-In-Self-Tests (BISTs), Basic Assurance Tests (BATs), and memory tests on all elements found by interrogating the host processors 101-104, memory controller/cache 108, and I/O bridge 110. Service processor 135 gathers and reports any error information for failures detected during the BISTs, BATs, and memory tests.

If a meaningful/valid configuration of system resources is still possible after taking out the elements found to be faulty during the BISTs, BATs, and memory tests, then data processing system 100 is allowed to proceed to load executable code into local (host) memories 160-163. Service processor 135 then releases host processors 101-104 for execution of the code loaded into local memory 160-163. While host processors 101-104 are executing code from respective operating systems within data processing system 100, service processor 135 enters a mode of monitoring and reporting errors. Service processor 135 monitors types of items including, for example, the cooling fan speed and operation, thermal sensors, power supply regulators, and recoverable and non-recoverable errors reported by processors 101-104, local memories 160-163, and I/O bridge 110.

Service processor 135 saves and reports error information related to all the monitored items in data processing system 100. Service processor 135 also takes action based on the type of errors and defined thresholds. For example, service processor 135 may take note of excessive recoverable errors on a processor's cache memory and decide that this is predictive of a hard failure. Based on this determination, service processor 135 may mark that resource for deconfiguration during the current running session and future Initial Program Loads (IPLs). IPLs are also sometimes referred to as a "boot" or "bootstrap."

Data processing system 100 may be implemented using various commercially available computer systems. For example, data processing system 100 may be implemented using IBM Power Systems available from International Business Machines Corporation. Such a system may support logical partitioning using an AIX operating system, which is also available from International Business Machines Corporation.

Memories, such as memory 191, NVRAM 192, local memories 160, 161, 162, and 163, or flash memory (not shown), are some examples of computer usable storage devices. Hard disk 150, a CD-ROM (not shown), and other similarly usable devices are some examples of computer usable storage devices including computer usable storage medium.

Those of ordinary skill in the art will appreciate that the hardware depicted in FIG. 1 may vary. For example, other peripheral devices, such as optical disk drives and the like, also may be used in addition to or in place of the hardware depicted. As another example, some physical resources, such as adapters, can be virtualized into corresponding virtual resources (not shown), and the virtual resources can then be allocated to the various partitions. As another example, the hardware depicted in FIG. 1 can be configured to use one or more virtual I/O server (VIOS) (not shown). The VIOS allows the sharing of physical resources, such as adapters, disks, controllers, processors, memories, and the like, between the supported logical partitions. Among other functions, between partitions, a shared VIOS helps reduce the need for large amounts of cabling, and perform live migration. The depicted example is not meant to imply architectural limitations with respect to the illustrative embodiments.

Figure 2A:
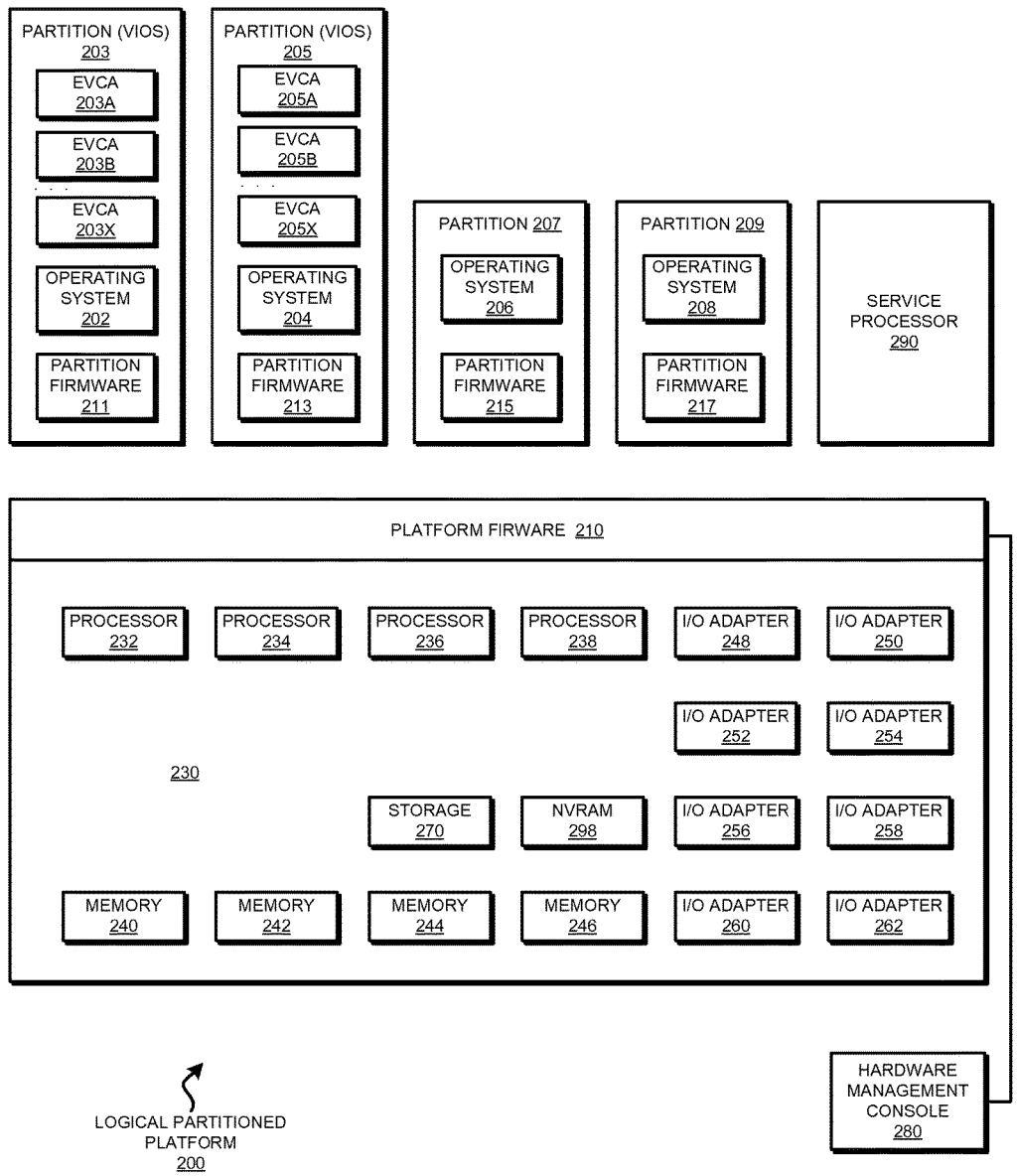
FIG. 2A depicts a block diagram of a data processing system in which illustrative embodiments may be implemented.

With reference to FIG. 2A, this figure depicts a block diagram of an example logically partitioned platform in which the illustrative embodiments may be implemented. The hardware in logically partitioned platform 200 may be implemented as, for example, the corresponding components depicted in data processing system 100 in FIG. 1.

Logically partitioned platform 200 includes partitioned hardware 230, operating systems 202, 204, 206, 208, and platform firmware 210. A platform firmware, such as platform firmware 210, is also known as partition management firmware. Operating systems 202, 204, 206, and 208 may be multiple copies of a single operating system or multiple heterogeneous operating systems simultaneously run on logically partitioned platform 200. These operating systems may be implemented using IBM-i, which is designed to interface with a partition management firmware, such as Hypervisor. IBM-i is used only as an example in these illustrative embodiments. Of course, other types of operating systems, such as AIX and Linux, may be used depending on the particular implementation. Operating systems 202, 204, 206, and 208 are located in partitions 203, 205, 207, and 209, respectively.

Hypervisor software is an example of software that may be used to implement partition management firmware 210 and is available from International Business Machines Corporation. Firmware is "software" stored in a memory chip that holds its content without electrical power, such as, for example, read-only memory (ROM), programmable ROM (PROM), erasable programmable ROM (EPROM), electrically erasable programmable ROM (EEPROM), and non-volatile random access memory (nonvolatile RAM).

Additionally, partitions 203, 205, 207, and 209 also include partition firmware 211, 213, 215, and 217, respectively. Partition firmware 211, 213, 215, and 217 may be implemented using initial boot strap code, IEEE-1275 Standard Open Firmware, and runtime abstraction software (RTAS), which is available from International Business Machines Corporation. When partitions 203, 205, 207, and 209 are instantiated, platform firmware 210 loads a copy of boot strap code onto partitions 203, 205, 207, and 209. Thereafter, control is transferred to the boot strap code with the boot strap code then loading the open firmware and RTAS. The processors associated or assigned to the partitions are then dispatched to the partition's memory to execute the partition firmware.

Partition 203 operates as a VIOS and includes a set of EVCAs 203A, 203B, and up to EVCA 203*x*. Partition 205 operates as another VIOS and includes a corresponding set of EVCAs 205A, 205B, up to EVCA 205X. in the prior-art, one prior-art VCA (not shown) in partition 203 partners with one corresponding prior-art VCA (not shown) in partition 205 over a VLAN that is unique to that pair of prior-art VCAs. In contrast, advantageously, any EVCA in partition 203, and any number thereof, can partner with any EVCA in partition 205, and any number thereof, to form a cluster over a single VLAN according to an embodiment described herein. Each of EVCAs 203A, 203B-203*x*, 205A, and 205B-205X comprises program instructions for carrying out the processes of any of the various embodiments. The program instructions may be stored on at least one of one or more computer-readable storage devices (e.g., hard disk 150, NVRAM 192, or a compact disk device coupled with I/O bus 112 in FIG. 1), for execution by at least one of one or more processors (e.g., processors 101-104 in FIG. 1) via at least one of one or more computer-readable memories (e.g., any of local memories 160-163 in FIG. 1). Each of EVCAs 203A, 203B-203X, 205A, and 205B-205X may be implemented in any form, including but not limited to a form suitable for execution as a service, a form implemented using hardware and software, or a form suitable for integration into another application.

Partitioned hardware 230 includes a plurality of processors 232-238, a plurality of system memory units 240-246, a plurality of input/output (I/O) adapters 248-262, and a storage unit 270. Each of the processors 232-238, memory units 240-246, NVRAM storage 298, and I/O adapters 248-262 may be assigned to one of partitions 203, 205, 207, and 209 within logically partitioned platform 200, each of which partitions 203, 205, 207, and 209 corresponds to one of operating systems 202, 204, 206, and 208. CPUs, memory, or NVRAM also may be shared between partitions that use or access them sequentially. I/O adapters may be assigned to a virtual I/O server to enable sharing of I/O bandwidth between partitions.

Partition management firmware 210 performs a number of functions and services for partitions 203, 205, 207, and 209 to create and enforce the partitioning of logically partitioned platform 200. Partition management firmware 210 is a firmware implemented virtual machine identical to the underlying hardware. Thus, partition management firmware 210 allows the simultaneous execution of independent OS images 202, 204, 206, and 208 by virtualizing at least some of the hardware resources of logically partitioned platform 200.

Service processor 290 may be used to provide various services, such as processing of platform errors in the partitions. These services also may act as a service agent to report errors back to a vendor, such as International Business Machines Corporation. Operations of partitions 203, 205, 207, and 209 may be controlled through a hardware management console, such as hardware management console 280. Hardware management console 280 is a separate data processing system from which a system administrator may perform various functions including reallocation of resources to different partitions.

The hardware in FIGS. 1-2 may vary depending on the implementation. Other internal hardware or peripheral devices, such as flash memory, equivalent non-volatile memory, or optical disk drives and the like, may be used in addition to or in place of certain hardware depicted in FIGS. 1-2. An implementation of the illustrative embodiments may also use alternative architecture for managing partitions without departing from the scope of the invention.

Figure 2B:
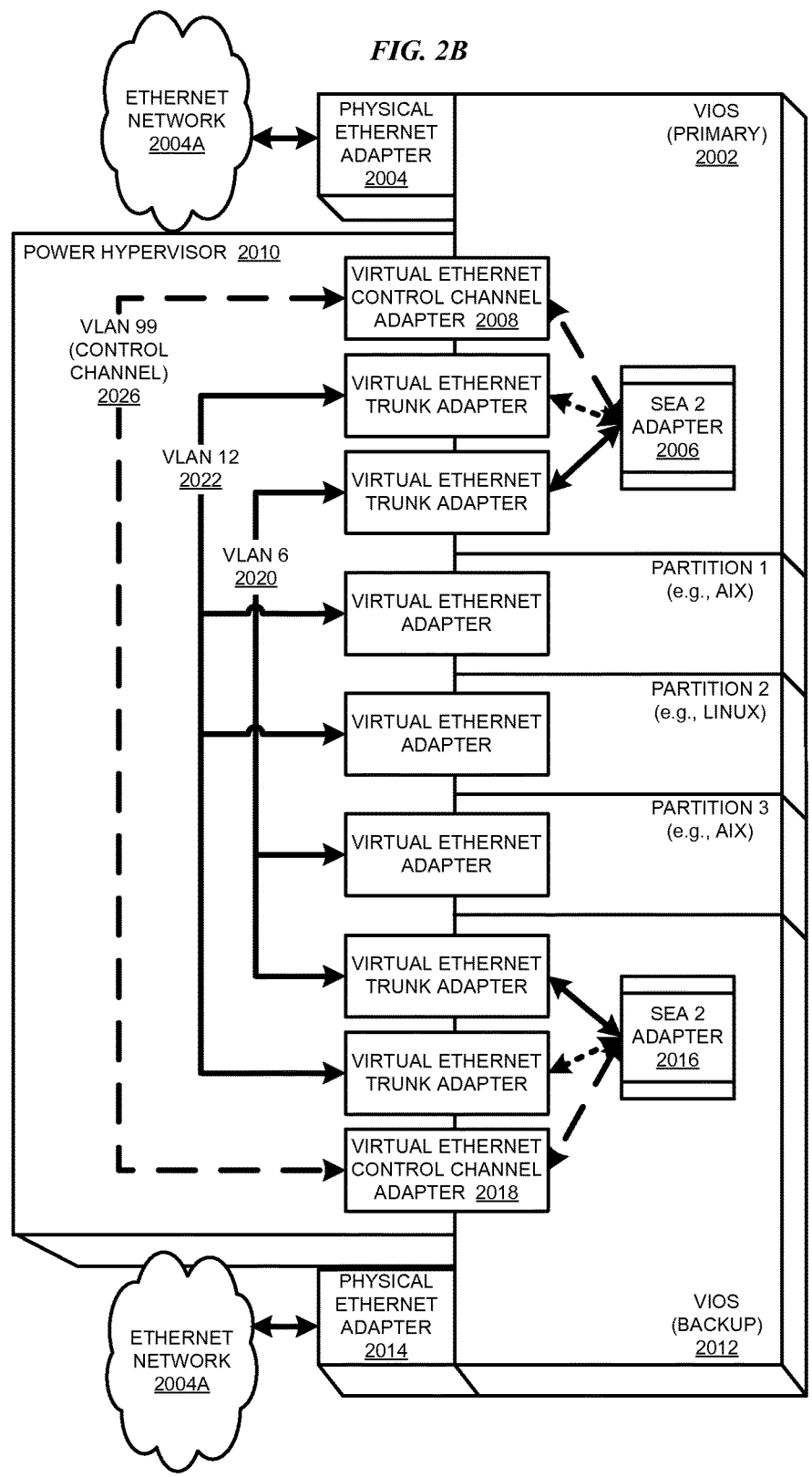
FIG. 2B depicts a block diagram of a virtualized data processing environment using several control channel VLANs, in which illustrative embodiments may be implemented.

With reference to FIG. 2B, this figure depicts a block diagram of a virtualized data processing environment using several control channel VLANs, in which illustrative embodiments may be implemented. VIOS 2002 can be implemented using partition 203 in FIG. 2A.

VIOS 2002 is configured to provide virtualized access to PEA 2004, such as via SEA 2006 and VCA 2008 as described earlier. PEA 2004 provides access to external network, such as Ethernet 2004A to virtual resources that use PEA 2004 in this configuration.

Similarly, VIOS 2012 can be implemented using partition 205 in FIG. 2A. VIOS 2012 is configured to provide virtualized access to PEA 2014, such as via SEA 2016 and VCA 2018 as described earlier. PEA 2014 provides access to external network, such as Ethernet 2014A to virtual resources that use PEA 2014 in this configuration.

Hypervisor 2010 is an example of platform firmware 201 in FIG. 2A. Hypervisor 2010 serves as a virtual switch using which VLANs 2020, 2022, and 2026 operate. VLANs 2020 and 2022 are examples of numerous VLANs that a customer may deploy for other productive uses. VLAN 2026 is one example of many management VLANs that can exist in a given configuration. As shown, VLAN 2026 is used in the control channel formed between VCA 2008 and VCA 2018. An embodiment enables any number of EVCA pairs to use a single VLAN such as VLAN 2026, removing the need for numerous VLAN 2026 type management VLANs in a given virtualized data processing environment.

Figure 3:
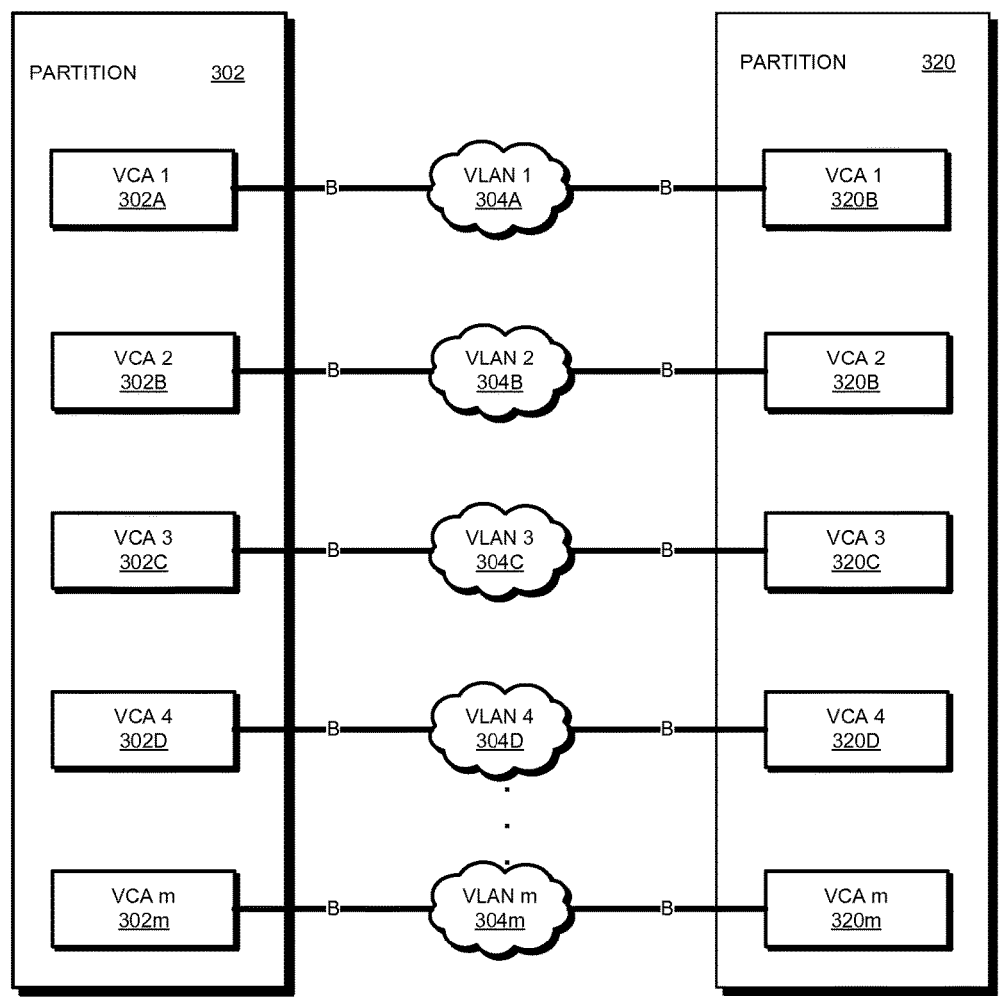
FIG. 3 depicts a block diagram of an example prior-art configuration for managing redundant VCAs that can be improved by using an illustrative embodiment.

With reference to FIG. 3, this figure depicts a block diagram of an example prior-art configuration for managing redundant VCAs that can be improved by using an illustrative embodiment. Partition 302 is an example of partition 203 in FIG. 2A, and partition 320 is an example of partition 205 in FIG. 2A.

Assume that partition 302 includes prior-art VCAs 302A, 302B, 302C, and similarly VCAs 302D-302m, and a partner partition 320 includes prior-art VCAs 320A, 320B, 320C, and similarly VCAs 320D-320m.

In the prior-art, as depicted in this figure, each VCA communicates with its partner VCA over a dedicated VLAN using broadcast messaging, as indicated by label "B" at each link from/to each participating VCAs. For example, VCA 302A communicates with VCA 320A over VLAN 304A using broadcast packets, VCA 302B communicates with VCA 320B over VLAN 304B using broadcast packets, VCA 302C communicates with VCA 320C over VLAN 304C using broadcast packets, VCA 302D communicates with VCA 320D over VLAN 304D using broadcast packets, and VCA 302M communicates with VCA 320M over VLAN 304M using broadcast packets. As is evident, significant amount of computing resources are consumed or reserved for handling such a volume of broadcast messages over such numerous management VLANs. Such a manner of managing VCAs or any other redundant virtual devices can be improved by using an embodiment according to PDP, as described herein.

Figure 4:
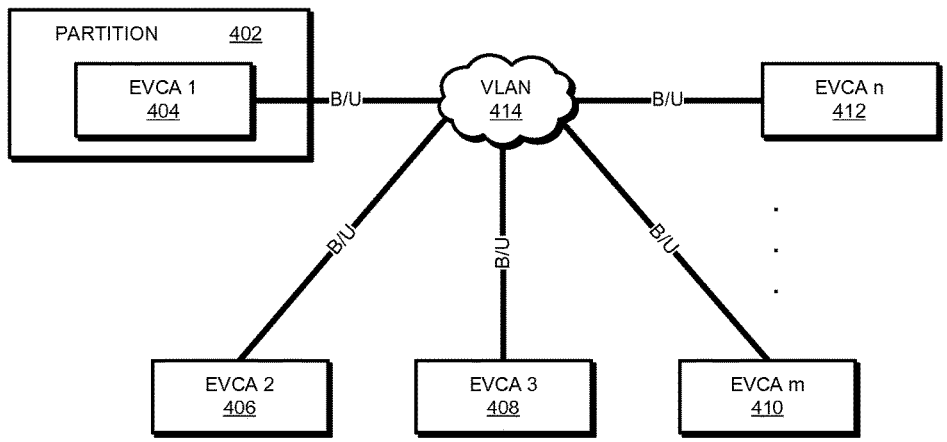
FIG. 4 depicts a block diagram of an example configuration for partner discovery in a control cluster using shared VLAN in accordance with an illustrative embodiment.

With reference to FIG. 4, this figure depicts a block diagram of an example configuration for partner discovery in a control cluster using shared VLAN in accordance with an illustrative embodiment. Partition 402 is similar to partition 320 in FIG. 3.

EVCA 404 (labeled "EVCA1") is an example EVCA operating in partition 402 and comprising an application according to an embodiment as applied to VCA1 in FIG. 3. EVCA 406 (labeled "EVCA2") is another example EVCA that similarly operates in another partition (not shown) and comprises an application according to an embodiment as applied to VCA2 in FIG. 3. EVCA 408 (labeled "EVCA3") is another example EVCA that similarly operates in another partition (not shown) and comprises an application according to an embodiment as applied to VCA3 in FIG. 3. EVCA 410 (labeled "EVCAm") is another example EVCA that similarly operates in another partition (not shown) and comprises another application according to an embodiment as applied to VCAm in FIG. 3. EVCA 412 (labeled "EVCAn") is another example EVCA that similarly operates in another partition (not shown) and comprises an application according to an embodiment as applied to VCAn in FIG. 3.

EVCAs 404-412 form a cluster as described herein. Each of EVCAs 404-412 communicate with each other over a single VLAN, to wit, VLAN 414. Furthermore, the communications between EVCAs 404-410 according to PDP utilizes selective broadcasting (as indicated by label "B/U" relative to the link to/from each EVCA 404-412), such as only for transmitting Hello packets over VLAN 414. For other purposes, such as to send or receive Live packets or Bye packets, EVCAs 404-412 utilize unicasting (as indicated by label "B/U" relative to the link to/from each EVCA 404-412), which reduces traffic congestion in VLAN 414 and reduces computing resource usage at EVCAs 404-412.

Figure 5:
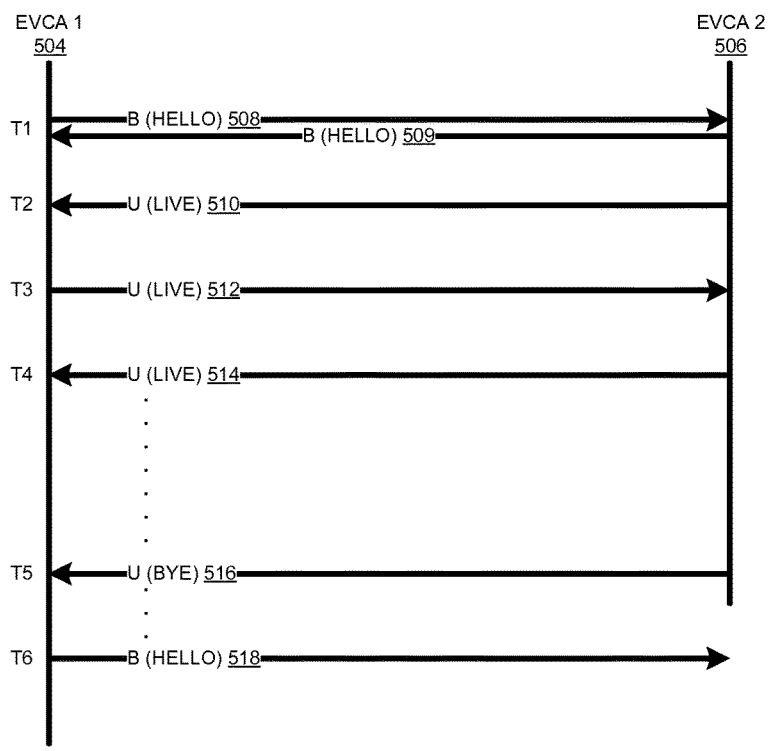
FIG. 5 depicts a PDP message flow between an example set of two devices in accordance with an illustrative embodiment.

With reference to FIG. 5, this figure depicts a PDP message flow between an example set of two devices in accordance with an illustrative embodiment. EVCA 504 (labeled "EVCA1") is an example of EVCA 404 in FIG. 4. EVCA 506 (labeled "EVCA2") is an example of EVCA 406 in FIG. 4.

At time T1, EVCA1 broadcasts Hello packet 508 over a VLAN, such as over VLAN 414 in FIG. 4, to any EVCA that might be listening on the VLAN. Before sufficient eca partnerships are formed in the control cluster, EVCA2 may also broadcast Hello packet 509 over the VLAN to any EVCA that might be listening on the VLAN. Other EVCAs may similarly broadcast Hello packets until certain partnership numerosity and other conditions are satisfied as described in this disclosure.

Suppose that while each of EVCA1 and EVCA2, and possibly other EVCAs, are broadcasting to form partnerships, EVCA2 receives the Hello packet 508. EVCA2 determines that EVCA2 satisfies a partner criterion in Hello packet 508.

At time T2, EVCA2 unicasts Live packet 510 to EVCA1. Live packet 510 identifies EVCA1 as EVCA2's partner.

At time T3, EVCA1 unicasts Live packet 512 to EVCA2. Live packet 512 identifies EVCA2 as EVCA1's partner.

At time T4, EVCA2 unicasts Live packet 514 to EVCA1. Live packet 514 continues to identify EVCA1 as EVCA2's partner. A periodicity of the Live packets, i.e., the time period between T2 and T4, is determined using a Live timer. In one embodiment, the Live timer is a single shared Live timer for all EVCAs participating in a given cluster. In another embodiment, the Live timer used by EVCA2 to time Live packets 510 and 514 is a Live timer for exclusive use by EVCA2.

Similarly, EVCA1 periodically unicasts Live packets to EVCA2. The periodicity of the Live packets unicast by EVCA1 is also determined by a shared-use or exclusive-use Live timer depending upon the particular embodiment.

This unicasting of Live packets between EVCA1 and EVCA2 continues until time T5. At time T5, EVCA2 sends by unicast Bye packet 516 to EVCA1. EVCA2 becomes unavailable in the cluster thereafter.

Because EVCA2 sent Bye packet 516, EVCA1 removes EVCA2 from EVCA1's partner list, reducing the number of partners for EVCA1 below a threshold number of partners, which in the simple case depicted in FIG. 5 is one. As a result of the number of partners for EVCA1 reducing below a threshold number of partners, EVCA1 broadcasts Hello packet 518 with a periodicity according to a Hello timer, and begins the discovery process for another partner who might be listening on the VLAN.

As described with respect to an example implementation earlier, if the threshold number of partners for EVCA1 is one, then at time T2, upon receiving Live packet 510 from EVCA2, EVCA1 stops broadcasting Hello packets. EVCA1 resumes broadcasting Hello packets at time T6 after the partner list of EVCA1 reduces below that threshold number.

Furthermore, in a simple configuration of two devices, a leadership determination may not be needed even if such capability is available in an implementation of PDP according to an embodiment. An embodiment can be configured to omit the comparison of priority or ranking information if it is known that no more than two devices are going to participate in a control cluster at any time. Determination. Such optional omission may be useful in further optimization of the implementation in such cases.

The leadership determination is useful in reducing multiple broadcasts by multiple devices on the single VLAN. However, when multiple broadcasting devices is not a concern in a cluster of redundant devices, or they are desirable in the cluster for some other reason, the leadership determination can be omitted in an implementation of an embodiment even when more than two devices are expected to participate in a control cluster.

Additionally, an implementation can adapt an embodiment to make the leadership determination in other implementation-specific ways. Some examples herein are described using the priority or ranking information for this purpose. An implementation can use the MAC address or some other information about the devices in a cluster to identify a group leader in any implementation-specific manner within the scope of the illustrative embodiments.

Figure 6:
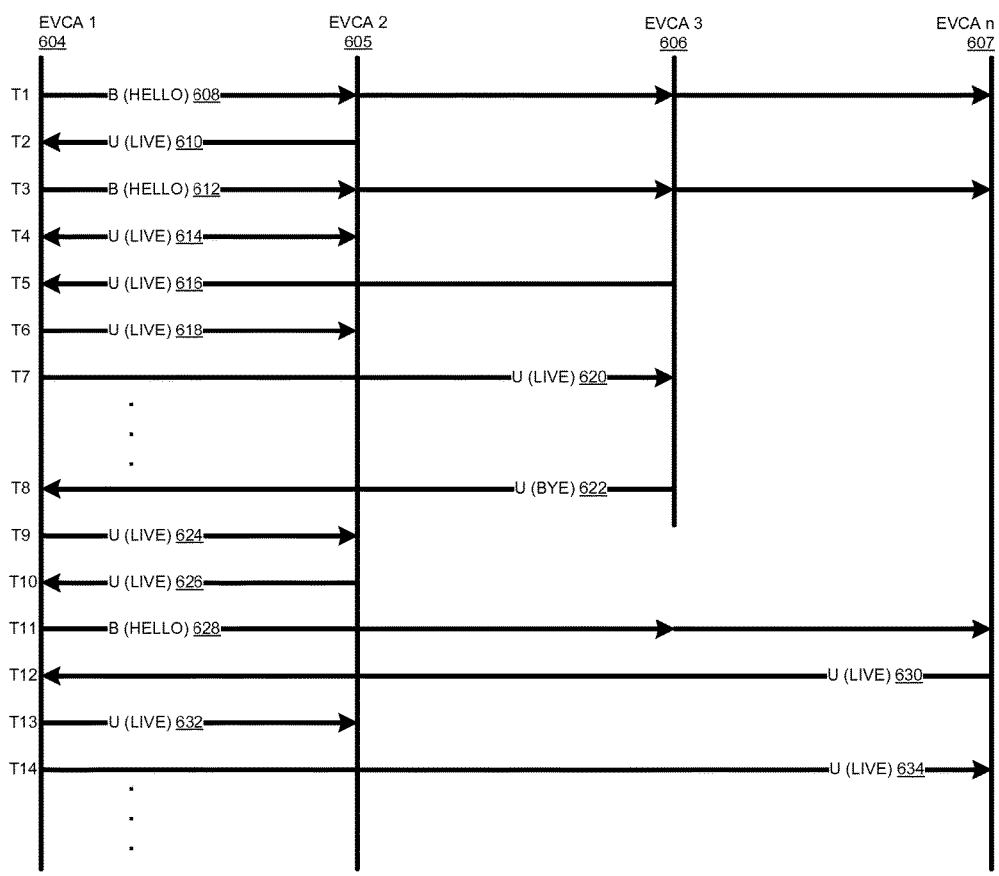
FIG. 6 depicts an example PDP message flow between a larger set of devices in accordance with an illustrative embodiment.

With reference to FIG. 6, this figure depicts an example PDP message flow between a larger set of devices in accordance with an illustrative embodiment. EVCA 604 (labeled "EVCA1") is an example of EVCA 504 in FIG. 5. EVCA 605 (labeled "EVCA2") is an example of EVCA 506 in FIG. 5. EVCA 606 (labeled "EVCA3") is an example of EVCA 408 in FIG. 4. EVCA 607 (labeled "EVCAn") is an example of EVCA 412 in FIG. 4.

For the clarity of the depiction, only some of the possible broadcast and unicast traffic is shown in FIG. 6. For example, while only some EVCAs are shown to broadcast, other EVCAs depicted in FIG. 6 may also broadcast until sufficient partnerships are formed and/or other conditions are satisfied in the cluster as described in this disclosure. Such additional broadcasts are omitted in FIG. 6 without implying such omissions in the operation of an embodiment. Similarly, all unicasting by each EVCA to each partner EVCA in the EVCA's partnership list is also not shown in order to avoid unnecessary complexity in the illustration of FIG. 6. Such omissions in FIG. 6 do not imply omissions in the operation of an embodiment.

FIG. 6 omits depicting the leadership determination aspect of PDP the change of group leader that can result from an operation shown therein. The leadership determination and any resulting changing of the group leader is described elsewhere in this disclosure, and those of ordinary skill in the art will be able to incorporate that procedure into the messaging shown in FIG. 6 with the aid of that description.

At time T1, EVCA1 broadcasts Hello packet 608 over a VLAN, such as over VLAN 414 in FIG. 4, to any EVCA that might be listening on the VLAN. EVCA2, EVCA3, and any number of EVCAs up to EVCAn receive Hello packet 608. Assume at that time only EVCA2 determines that EVCA2 satisfies a partner criterion in Hello packet 608.

At time T2, EVCA2 unicasts Live packet 610 to EVCA1. Live packet 610 identifies EVCA1 as EVCA2's partner.

At time T3 according to a periodicity determined by a Hello timer after time T1, EVCA1 broadcasts Hello packet 612, for example, because a threshold number of partner EVCAs have not established partnership with EVCA1 yet. Hello packet 612 identifies EVCA2 as EVCA1's partner.

At time T4, EVCA2 unicasts Live packet 614 to EVCA1. Live packet 614 identifies EVCA1 as EVCA2's partner.

In response to Hello packet 612, EVCA3 decides that EVCA3 meets a partnership criterion in Hello packet 612. Accordingly, at time T5, EVCA3 unicasts Live packet 616 to EVCA1. Live packet 616 identifies EVCA1 as EVCA3's partner.

At a periodicity determined by a Live timer, EVCA1 unicasts Live packet 618 to EVCA2 at time T6 and unicasts Live packet 620 to EVCA3 at time T7. Live packets 618 and 620 identify EVCA2 and EVCA3 as EVCA1's partners.

Assume that the threshold number of partners in EVCA1's partner list was two, and that number is now satisfied with EVCA2 and EVCA3 being EVCA1's partners. Accordingly, EVCA1 stops broadcasting Hello packets.

Live packets exchange continues between EVCA1, EVCA2, and EVCA3 in the manner of Live packets 614, 616, 618, and 620 until time T8.

At time T8, EVCA2 sends by unicast Bye packet 622 to EVCA1. EVCA2 becomes unavailable in the cluster thereafter. Live packets 624 and 626 continue to be exchanged at times T9 and T10, respectively between EVCA1 and EVCA2, which remain in the partnership. Live packet 624 identifies only EVCA2 as EVCA1's partner. If EVCA2 had added EVCA3 to EVCA2's partner list as a result of Live packet 618, EVCA2 may remove EVCA3 from EVCA2's partner list in Live packet 626, as a result of Live packet 624.

Because EVCA2 sent Bye packet 622, EVCA1 removes EVCA2 from EVCA1's partner list, reducing the number of partners for EVCA1 below the threshold number of partners. As a result, EVCA1 reinitiates broadcasting Hello packet 628 with a periodicity according to a Hello timer, and begins the discovery process for another partner who might be listening on the VLAN.

Note that the broadcasting of Hello packet 628 is shown at time T11 after the unicasting of Live packets 624 and 626 only as a non-limiting example. The broadcasting of Hello packet 628 is independent of the unicasting of Live packets 624 or 626, and could have begun prior to unicast of Live packet 624, or 628, or both, depending on the periods set in the Live timer(s), the Hello timer, or some combination thereof.

In response to Hello packet 628, EVCAn decides that EVCAn meets a partnership criterion in Hello packet 628. Accordingly, at time T12, EVCAn unicasts Live packet 630 to EVCA1. Live packet 630 identifies EVCA1 as EVCAn's partner. Live packet 630 may also identify EVCA2 as a partner of EVCAn due to Hello packet 628 identifying EVCA2 as EVCA1's partner.

The threshold number of partners in EVCA1's partner list is again satisfied with EVCA2 and EVCAn being EVCA1's partners. Accordingly, EVCA1 stops broadcasting Hello packets.

At a periodicity determined by the Live timer, EVCA1 unicasts Live packet 632 to EVCA2 at time T13 and unicasts Live packet 634 to EVCAn at time T14. Live packets 632 and 634 identify EVCA2 and EVCAn as EVCA1's partners.

The Live packets exchange, stopping and starting of the Hello packet broadcasts continues in this manner. The above description assumes EVCA1 in the group leader role. Should EVCA1 send a Bye packet, another EVCA in the remaining cluster, such as EVCA2 or EVCAn after time T14 can assume the group leader role depending upon which of the two EVCAs has a higher ranking according to any suitable determination method.

Figure 7:
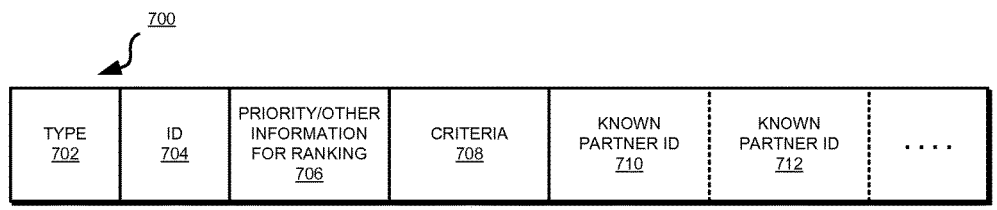
FIG. 7 depicts a block diagram of an example PDP packet in accordance with an illustrative embodiment.

With reference to FIG. 7, this figure depicts a block diagram of an example PDP packet in accordance with an illustrative embodiment. packet 700 can be configured as Hello packet 608 or 628 in FIG. 6, Live packet 610, 618, 620, or 630 in FIG. 6, or Bye packet 622 in FIG. 6.

Type attribute 702 identifies the packet as Hello packet, Live packet, or Bye packet according to PDP described herein. Identifier attribute 704 identifies the sender of the packet, such as by the sender device's MAC address, or any other suitable identifier that is unique among the participating devices.

Attribute 706 specifies a priority of the sender device or other ranking information usable for establishing the sender device's relative rank in a control cluster. Attribute 706 is optional, because an embodiment is configurable to use other information about the sender device for this purpose. For example, a suitably configured method for leadership determination can use the MAC address in attribute 704 to rank the sender device in the cluster without requiring attribute 706 to be present or populated in packet 700.

Attribute 708 defines one or more conditions or criteria that should be satisfied by a receiver of packet 700, for the receiver device to become a partner of the sender of packet 700. Attribute 708 is a set of attributes in one embodiment, each attribute in a set defining one condition or criterion.

Attribute 710, and any number of similar attributes, e.g., attribute 712, include information identifying an existing partner of the sender device of packet 700. When the sender device has no partners, attribute 710 and other such attributes may contain no identifying information or may be absent from packet 700 altogether. In one embodiment, a single instance of attribute 710 includes identifying information of all the partners, e.g., without requiring attribute 712 or other similar attributes to separately identify each partner device.

The example structure of packet 700 is not intended to be limiting on the illustrative embodiments. From this disclosure, those of ordinary skill in the art will be able to conceive other suitable structures for similar purposes, and the same are contemplated within the scope of the illustrative embodiments.

Figure 8:
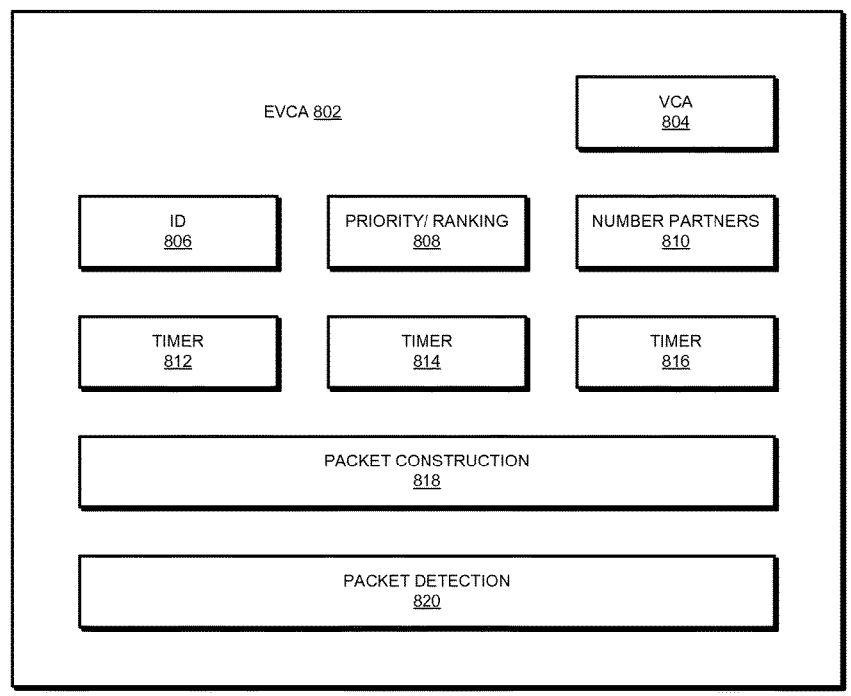
FIG. 8 depicts a block diagram of an example configuration of an EVCA in accordance with an illustrative embodiment.

With reference to FIG. 8, this figure depicts a block diagram of an example configuration of an EVCA in accordance with an illustrative embodiment. EVCA 802 is an example of any of EVCAs 604, 605, 606, or 607 in FIG. 6.

EVCA 802 includes, encapsulates, or otherwise represents prior-art VCA 804. EVCA 802 further includes identifier 806, which provides the information for attribute 704 in FIG. 7. EVCA 802 includes priority or other ranking information 808, which provides the information for attribute 706 in FIG. 7.

Attribute 810 is configurable to hold a threshold value, where the threshold value is usable to determine whether a partner list of EVCA 802 includes sufficient number of partners. Timer 812 is usable as a Hello timer. Timer 814 is usable as a Live timer. Timer 816 is usable as a Live timeout timer.

Component 818 constructs Hello packet, Live packet, or Bye packet as may be needed for broadcasting or unicasting from EVCA 802 to other EVCAs. Component 820 detects Hello packet, Live packet, or Bye packet, as may be broadcasted or unicasted to EVCA 802 from other EVCAs.

Figure 9:
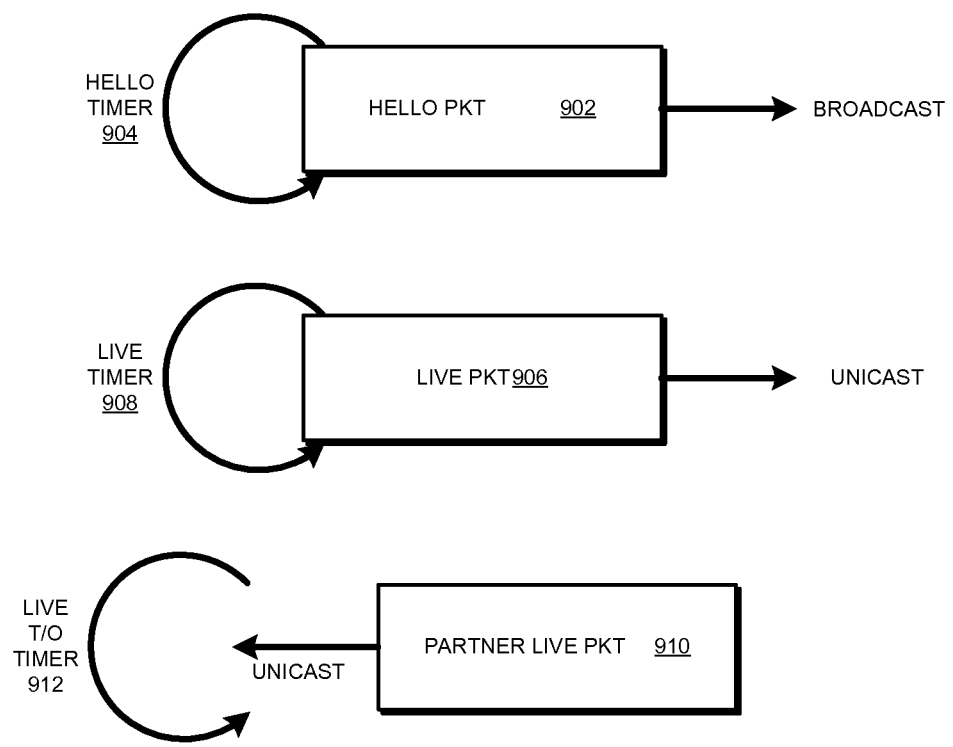
FIG. 9 depicts a timed broadcasting or unicasting of various packets in PDP in accordance with an illustrative embodiment.

With reference to FIG. 9, this figure depicts a timed broadcasting or unicasting of various packets in PDP in accordance with an illustrative embodiment. Hello packet 902 is an example of Hello packet 608 or other Hello packets in FIG. 6.

Hello timer 904 governs when an EVCA broadcasts Hello packet 902. Hello timer 904 can be implemented using timer 812 in FIG. 8, or a timer external (not shown) to an EVCA that is shared by some or all devices in a cluster for timing the Hello packet broadcasts.

Hello packet 906 is an example of Live packet 618 or other Live packets sent (for example, from EVCA1) in FIG. 6. Live timer 908 governs when an EVCA unicasts Live packet 906. Live timer 908 can be implemented using timer 814 in FIG. 8, or a timer external (not shown) to an EVCA that is shared by some or all devices in a cluster for timing the Live packet unicasts at sender devices.

Partner Live packet 910 is an example of Live packet 610 or other Live packets received (for example, at EVCA1) in FIG. 6. Live timeout timer 912 governs when an EVCA, from which a unicasted Live packet 910 has not been received within the period set by Live timeout timer 912, can be regarded as inactive or otherwise unavailable in the control cluster. Live timeout timer 912 can be implemented using timer 816 in FIG. 8, or a timer external (not shown) to an EVCA that is shared by some or all devices in a cluster for timing out the Live packet unicasts at receiver devices.

Figure 10:
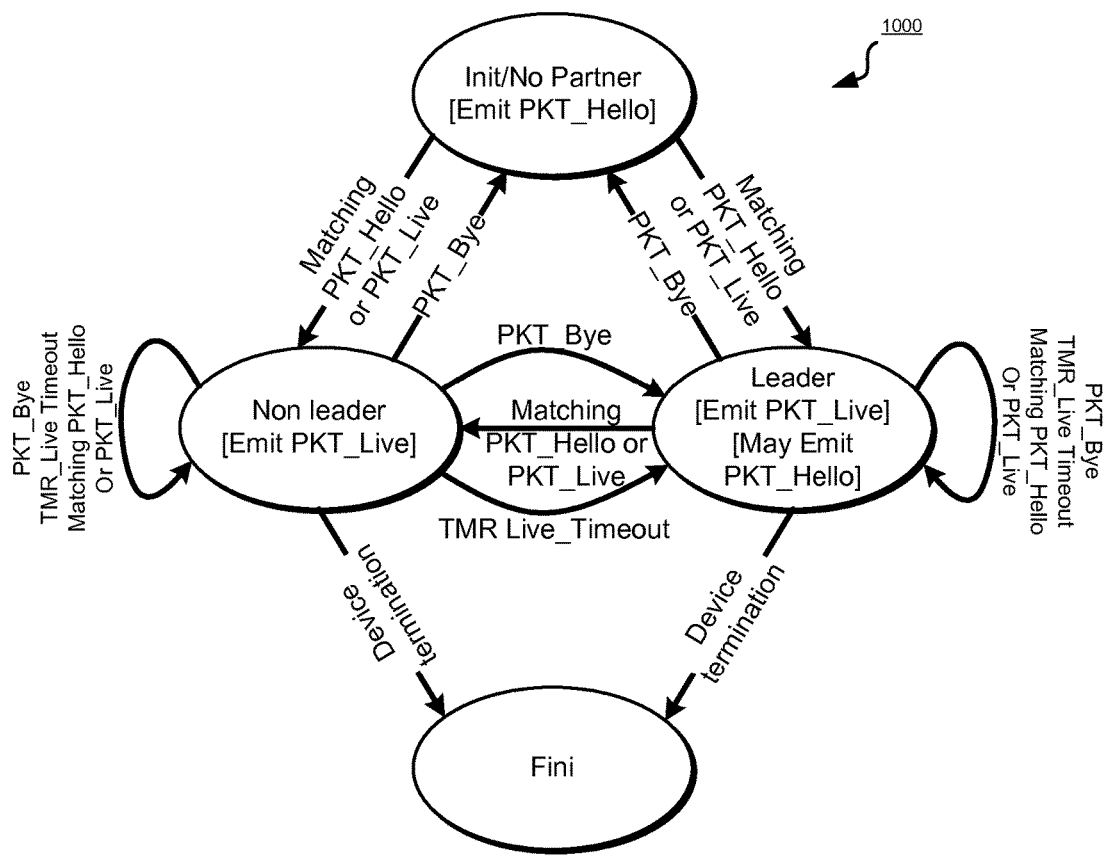
FIG. 10 depicts a state diagram representing the operations of partner discovery in a control cluster using shared VLAN in accordance with an illustrative embodiment.

With reference to FIG. 10, this figure depicts a state diagram representing the operations of partner discovery in a control cluster using shared VLAN in accordance with an illustrative embodiment. An example execution of these operations according to PDP described herein is represented in state diagram 1000.

FIG. 11A depicts a flowchart of an example process for maintaining partnerships in a control cluster using shared VLAN in accordance with an illustrative embodiment. Process 1100 can be implemented in a device, e.g., in EVCA 802 in FIG. 8.

The device determines if the device's partner list is empty (block 1102). If the partner list is empty ("Yes" path of block 1102), the device ends process 1100 thereafter. If the partner list is not empty ("No" path of block 1102), the device unicasts Live packets to each partner in the device's partner list (block 1104). The device initiates a Live timer if the Live timer has not been previously initiated (block 1106). The device waits for the Live timer to elapse (block 1108). The device repeats blocks 1102-1108 as long as a partner exists in the device's partner list, and the device is not terminated. When no partner exists in the device's partner list, or the device is terminated the device ends process 1100 thereafter via the "Yes" path of block 1102.

FIG. 11B depicts a flowchart of an example process for partner discovery in a control cluster using shared VLAN in accordance with an illustrative embodiment. Process 1110 can be implemented in a device, e.g., in EVCA 802 in FIG. 8.

The device determines whether the device is a group leader, and whether a number of partners in the device's partner list is less than a threshold number of partners (block 1111). If the device is a group leader, and the number of partners in the device's partner list is less than a threshold number of partners ("Yes" path of block 1111), the device broadcasts a Hello packet (block 1112). The device initiates a Hello timer if the Hello timer has not been previously initiated (block 1114). The device waits for the Hello timer to elapse (Block 1118).

The device returns process 1110 to block 1111. If the device is not a group leader, or the number of partners in the device's partner list is not less than a threshold number of partners ("No" path of block 1111), the device ends process 1110 thereafter.

Figure 11C:
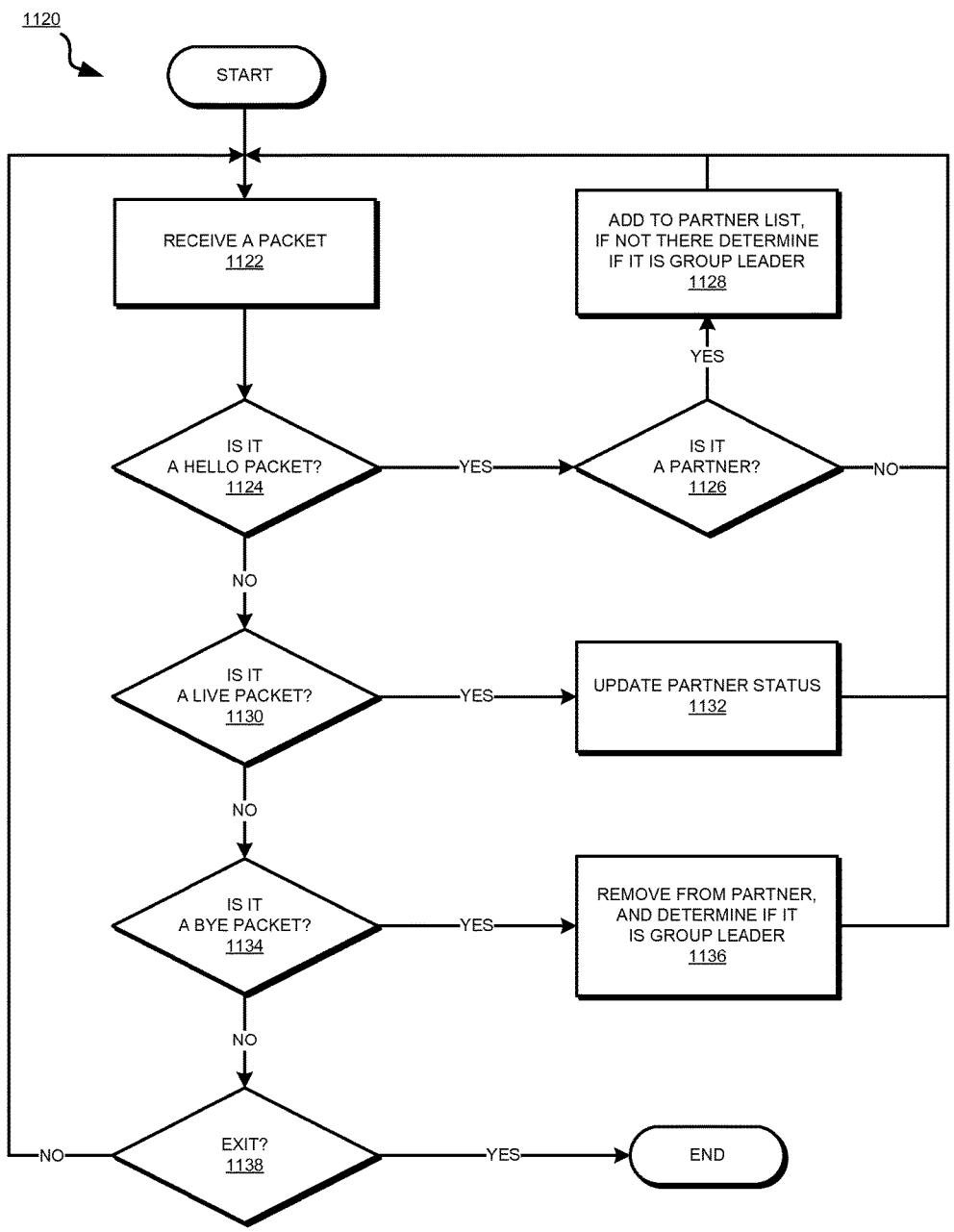
FIG. 11C a flowchart of an example process for continued operation of partner discovery in a control cluster using shared VLAN in accordance with an illustrative embodiment.

FIG. 11C depicts a flowchart of an example process for continued operation of partner discovery in a control cluster using shared VLAN in accordance with an illustrative embodiment. Process 1120 can be implemented in a device, e.g., in EVCA 802 in FIG. 8.

The device receives a packet (block 1122). The device determines whether the packet is a Hello packet (block 1124). If the packet is a Hello packet ("Yes" path of block 1124), the device determines whether the sender of the Hello packet is already a partner or is suitable to be a partner of the device (block 1126). If the sender device can be a partner ("Yes" path of block 1126), the device adds the sender device to the device's partner list, if the sender device is not already listed in the device's partner list, and the device further evaluates whether the device is a group leader in the modified partner group (block 1128). If the device is elected as a group leader, the device activates process 1110 of FIG. 11B, if process 1110 is not already executing. The device returns process 1120 to block 1122. If the sender device cannot be a partner ("No" path of block 1126), the device returns process 1120 to block 1122.

If the packet is not a Hello packet ("No" path of block 1124), the device determines whether the packet is a Live packet (block 1130). If the packet is a Live packet ("Yes" path of block 1130), the device updates the sender device's status in the device's partner list indicating that the partner sender device is alive (block 1132). If a new partner is added as a result, the device activates process 1100 of FIG. 11A, if process 1100 is not already executing. The device returns process 1120 to block 1122.

If the packet is not a Live packet ("No" path of block 1130), the device determines whether the packet is a Bye packet (block 1134). If the packet is a Bye packet ("Yes" path of block 1134), the device removes the sender device from the device's partner list and evaluates whether the device has now become the group leader in the modified partner group (block 1136). If the device is elected as a group leader, the device activates process 1110 of FIG. 11B, if process 1110 is not already executing. Thereafter, the device returns process 1120 to block 1122.

If the packet is not a Bye packet ("No" path of block 1134), the device determines whether to exit process 1120 (block 1138). If process 1120 should be exited ("Yes" path of block 1138), the device ends process 1120 thereafter. Otherwise ("No" path of block 1138), the device returns process 1120 to block 1122.

Figure 12:
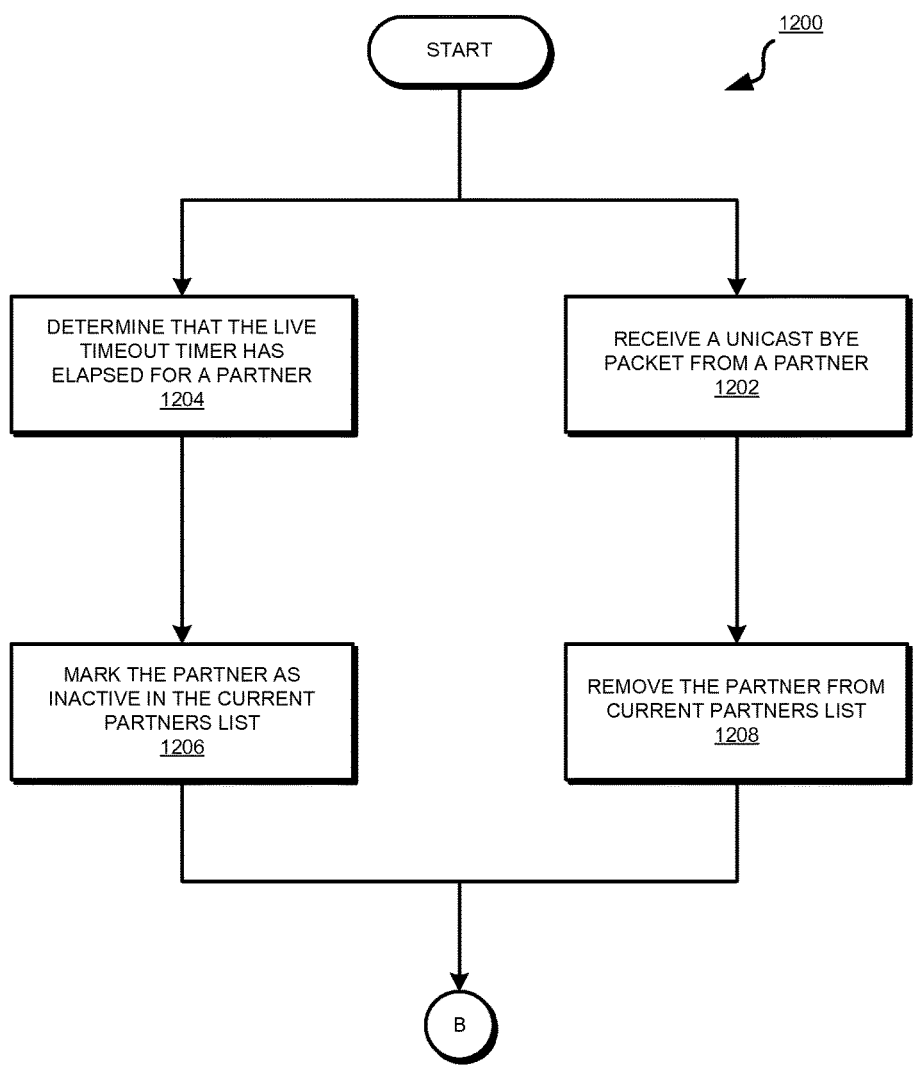
FIG. 12 depicts a flowchart of an example process for terminating a partnership in a control cluster in accordance with an illustrative embodiment.

With reference to FIG. 12, this figure depicts a flowchart of an example process for terminating a partnership in a control cluster in accordance with an illustrative embodiment. Process 1200 can be implemented in a device that participates in a control cluster, e.g., in EVCA 802 in FIG. 8.

The device either receives a unicast Bye packet from a partner device (block 1202), or the device determines that the Live timeout timer has elapsed for a partner device without having received a Live packet from that partner device (block 1204). If the Live timeout timer has elapsed for a partner device without having received a Live packet from that partner device, the device marks that partner device as inactive without actually removing the partner device from the partners list to accommodate the possibility that a packet was lost or the partner was busy, or other such transient situation (block 1206).

If the device receives a unicast Bye packet from a partner device, the device proceeds to remove the partner from the device's current partner list (block 1208). The device then proceeds to exit point marked "B" to enter process 1120 of FIG. 11C, at a corresponding entry point marked "B" in process 1120.

With reference to FIG. 13, this figure depicts a flowchart of an example process for exiting a control cluster in accordance with an illustrative embodiment. Process 1300 can be implemented in a device that participates in a control cluster, e.g., in EVCA 802 in FIG. 8.

The device determines that the device is about to terminate or otherwise become unavailable for the control cluster (block 1302). The device unicasts a Bye packet to each current partner device in the device's partner list (block 1304). The device ends process 1300 thereafter.

Thus, a system or apparatus, and computer program product are provided in the illustrative embodiments for partner discovery in a control cluster using shared VLAN. Where an embodiment or a portion thereof is described with respect to a type of device, the computer implemented method, system or apparatus, the computer program product, or a portion thereof, are adapted or configured for use with a suitable and comparable manifestation of that type of device.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer usable program product comprising a computer readable storage device including computer usable code for partner discovery in a control cluster using a shared virtual local area network (VLAN), the computer usable code comprising: computer usable code for determining, at a first virtual device executing in a data processing system, whether a partner list associated with the first virtual device includes a threshold number of partner virtual devices, the first virtual device participating in the control cluster, and a partner virtual device in the partner list of the first virtual device operates as a redundant backup of the first virtual device, the first virtual device and the partner virtual device forming a control channel in the control cluster, the control cluster including the first virtual device and each partner virtual device from the partner list of the first virtual device, and wherein any virtual device in the control cluster can operate as a control adapter in the control cluster; computer usable code for unicasting over the VLAN, responsive to the partner list not being empty, to each partner virtual device identified in the partner list, a first Live packet wherein the first Live packet identifies each partner virtual device already in the partner list of the first virtual device; computer usable code for receiving over the VLAN, responsive to the partner list not being empty, a unicast of a second Live packet from a second virtual device to the first virtual device, the second virtual device being identified in the partner list; computer usable code for broadcasting over the VLAN, a Hello packet, to cause the Hello packet to reach a third virtual device, wherein the Hello packet is configured to discover a new partner virtual device to add to the partner list, discovering the new partner enlarging the control cluster; and wherein the third virtual device is a member of a plurality of virtual devices that are available in the data processing system but are not on the partner list, further comprising: computer usable code for constructing, at the first virtual device, the Hello packet, the Hello packet communicating to a virtual device that is not on the partner list (i) that the first virtual device is available in the control cluster, (ii) the condition that has to be satisfied to become a partner virtual device of the first virtual device, and (iii) a list of identifiers comprising identifiers of each partner on the partner list of the first virtual device.

2. The computer usable program product of claim 1, wherein the computer usable code is stored in a computer readable storage device in a data processing system, and wherein the computer usable code is transferred over a network from a remote data processing system.

3. The computer usable program product of claim 1, wherein the computer usable code is stored in a computer readable storage device in a server data processing system, and wherein the computer usable code is downloaded over a network to a remote data processing system for use in a computer readable storage device associated with the remote data processing system.

4. A data processing system for partner discovery in a control cluster using a shared virtual local area network (VLAN), the data processing system comprising: a storage device, wherein the storage device stores computer usable program code; and a processor, wherein the processor executes the computer usable program code, and wherein the computer usable program code comprises: computer usable code for determining, at a first virtual device executing in a data processing system, whether a partner list associated with the first virtual device includes a threshold number of partner virtual devices, the first virtual device participating in the control cluster, and a partner virtual device in the partner list of the first virtual device operates as a redundant backup of the first virtual device, the first virtual device and the partner virtual device forming a control channel in the control cluster, the control cluster including the first virtual device and each partner virtual device from the partner list of the first virtual device, and wherein any virtual device in the control cluster can operate as a control adapter in the control cluster; computer usable code for unicasting over the VLAN, responsive to the partner list not being empty, to each partner virtual device identified in the partner list, a first Live packet wherein the first Live packet identifies each partner virtual device already in the partner list of the first virtual device; computer usable code for receiving over the VLAN, responsive to the partner list not being empty, a unicast of a second Live packet from a second virtual device to the first virtual device, the second virtual device being identified in the partner list; computer usable code for broadcasting over the VLAN, a Hello packet, to cause the Hello packet to reach a third virtual device, wherein the Hello packet is configured to discover a new partner virtual device to add to the partner list, discovering the new partner enlarging the control cluster; and wherein the third virtual device is a member of a plurality of virtual devices that are available in the data processing system but are not on the partner list, further comprising: computer usable code for constructing, at the first virtual device, the Hello packet, the Hello packet communicating to a virtual device that is not on the partner list (i) that the first virtual device is available in the control cluster, (ii) the condition that has to be satisfied to become a partner virtual device of the first virtual device, and (iii) a list of identifiers comprising identifiers of each partner on the partner list of the first virtual device.

\* \* \* \* \*